United States Patent
Sato

(10) Patent No.: US 12,298,625 B2
(45) Date of Patent: May 13, 2025

(54) ELECTRONIC MIRROR DEVICE

(71) Applicant: Panasonic Intellectual Property Management Co., Ltd., Osaka (JP)

(72) Inventor: Hiroaki Sato, Kanagawa Ken (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 247 days.

(21) Appl. No.: 17/979,557

(22) Filed: Nov. 2, 2022

(65) Prior Publication Data

US 2023/0185133 A1 Jun. 15, 2023

(30) Foreign Application Priority Data

Dec. 10, 2021 (JP) ................. 2021-200542

(51) Int. Cl.
*G02F 1/13363* (2006.01)
*B60R 1/12* (2006.01)
(Continued)

(52) U.S. Cl.
CPC ............ *G02F 1/13363* (2013.01); *B60R 1/12* (2013.01); *C08J 5/18* (2013.01); *G02F 1/133331* (2021.01);
(Continued)

(58) Field of Classification Search
CPC ......... G02F 1/133528; G02F 1/133531; G02F 1/133536
See application file for complete search history.

(56) References Cited

U.S. PATENT DOCUMENTS 9,557,621 B2  1/2017  Nagase et al.
10,663,621 B2  5/2020  Koma et al.
(Continued)

FOREIGN PATENT DOCUMENTS

CN   102887114   1/2013
CN   104885005   9/2015
(Continued)

OTHER PUBLICATIONS

Office Action issued in Corresponding JP Patent Application No. 2021-200542, dated Feb. 12, 2025, along with an English translation thereof.
(Continued)

*Primary Examiner* — Paisley L Wilson
(74) *Attorney, Agent, or Firm* — Greenblum & Bernstein, P.L.C.

(57) ABSTRACT

An electronic mirror device includes: a liquid crystal panel that displays an image; a linearly reflective polarizing layer that transmits a polarization component of incident light in a first direction and reflects a polarization component of the incident light in a second direction different from the first direction; a glass that transmits the incident light; and a PET film bonded to the glass. The linearly reflective polarizing layer is disposed between the liquid crystal panel and the PET film. The PET film contains polyethylene terephthalate and has a retardation value in a range of 2000 nm or more and 4000 nm or less. An angle between a slow axis of the PET film and a polarization reflection axis of the linearly reflective polarizing layer is 30 degrees or more and 60 degrees or less.

14 Claims, 18 Drawing Sheets

(51) Int. Cl.
*C08J 5/18* (2006.01)
*G02F 1/1333* (2006.01)
*G02F 1/1335* (2006.01)
*G02F 1/1347* (2006.01)
*G02F 1/139* (2006.01)

(52) U.S. Cl.
CPC .. *G02F 1/133536* (2013.01); *G02F 1/133553* (2013.01); *G02F 1/133562* (2021.01); *G02F 1/133631* (2021.01); *G02F 1/13478* (2021.01); *G02F 1/1396* (2013.01); *B60R 2001/1253* (2013.01); *B60R 2300/8066* (2013.01); *C08J 2367/02* (2013.01); *G02F 2202/02* (2013.01); *G02F 2202/28* (2013.01); *G02F 2203/02* (2013.01); *G02F 2413/08* (2013.01); *G02F 2413/12* (2013.01)

(56) References Cited

U.S. PATENT DOCUMENTS

| | | | |
|---|---|---|---|
| 10,768,461 | B2 | 9/2020 | Lee et al. |
| 11,422,404 | B2 | 8/2022 | Marumo et al. |
| 2012/0229732 | A1* | 9/2012 | Koike ................ G02F 1/13363 359/492.01 |
| 2018/0099614 | A1 | 4/2018 | Taguchi et al. |
| 2018/0149918 | A1 | 5/2018 | Yuan et al. |
| 2019/0079304 | A1 | 3/2019 | Ando et al. |
| 2019/0162881 | A1 | 5/2019 | Cammenga et al. |
| 2021/0001778 | A1 | 1/2021 | Oishi |

FOREIGN PATENT DOCUMENTS

| | | | |
|---|---|---|---|
| CN | 106526951 | | 3/2017 |
| CN | 111936925 | | 11/2020 |
| JP | 2001-240813 | | 9/2001 |
| JP | 2011-215646 | | 10/2011 |
| JP | 5789564 | | 10/2015 |
| JP | 2015-215734 | | 12/2015 |
| JP | 5991689 | | 9/2016 |
| JP | 2017-007565 | | 1/2017 |
| JP | 2017-167267 | | 9/2017 |
| JP | 2017-227879 | | 12/2017 |
| JP | 2019-174705 | | 10/2019 |
| JP | 2019174705 | A * | 10/2019 ............... B60R 1/04 |
| JP | 2020-8883 | | 1/2020 |
| JP | 2021-162731 | | 10/2021 |
| WO | 2016/167341 | | 10/2016 |
| WO | 2017/145580 | | 8/2017 |
| WO | 2018/199716 | | 11/2018 |

OTHER PUBLICATIONS

Office Action issued in Corresponding CN Patent Application No. 202211485072.0, dated Mar. 7, 2025, along with an English translation thereof.

* cited by examiner

MIRROR IMAGE DISPLAY

PICTURE IMAGE DISPLAY

FIG.12

| | RETARDATION FILM | THICKNESS [μm] | RETARDATION VALUE [nm] | UNEVENNESS EVALUATION RESULT |
|---|---|---|---|---|
| SAMPLE 1 | SEQUENTIALLY BIAXIALLY STRETCHED PET FILM A | 100 | 2030 | ○ |
| SAMPLE 2 | SEQUENTIALLY BIAXIALLY STRETCHED PET FILM B | 100 | 2920 | ○ |
| SAMPLE 3 | SEQUENTIALLY BIAXIALLY STRETCHED PET FILM C | 100 | 3890 | ○ |
| COMPARATIVE EXAMPLE 1 | SEQUENTIALLY BIAXIALLY STRETCHED PET FILM D | 50 | 980 | × |
| COMPARATIVE EXAMPLE 2 | SEQUENTIALLY BIAXIALLY STRETCHED PET FILM E | 50 | 1420 | × |
| COMPARATIVE EXAMPLE 3 | SEQUENTIALLY BIAXIALLY STRETCHED PET FILM F | 50 | 1860 | × |
| COMPARATIVE EXAMPLE 4 | NONE | - | - | × |

| | RETARDATION FILM | THICKNESS [μm] | RETARDATION VALUE [nm] | UNEVENNESS EVALUATION RESULT |
|---|---|---|---|---|
| SAMPLE 4 | SEQUENTIALLY BIAXIALLY STRETCHED PET FILM G | 100 | 2050 | ○ |
| SAMPLE 5 | SEQUENTIALLY BIAXIALLY STRETCHED PET FILM H | 100 | 2860 | ○ |
| SAMPLE 6 | SEQUENTIALLY BIAXIALLY STRETCHED PET FILM I | 100 | 3990 | ○ |
| COMPARATIVE EXAMPLE 5 | SEQUENTIALLY BIAXIALLY STRETCHED PET FILM J | 50 | 960 | × |
| COMPARATIVE EXAMPLE 6 | SEQUENTIALLY BIAXIALLY STRETCHED PET FILM K | 50 | 1310 | × |
| COMPARATIVE EXAMPLE 7 | SEQUENTIALLY BIAXIALLY STRETCHED PET FILM L | 50 | 1740 | × |
| COMPARATIVE EXAMPLE 8 | NONE | - | - | × |

ELECTRONIC MIRROR DEVICE

CROSS-REFERENCE TO RELATED APPLICATIONS

This application is based upon and claims the benefit of priority from Japanese Patent Application No. 2021-200542, filed Dec. 10, 2021, the entire contents of which are incorporated herein by reference.

FIELD

Embodiments described herein relate generally to a display device.

BACKGROUND

There has been known a mirror, a so-called electronic mirror device, mounted on a vehicle and having a function of displaying a mirror image of the rear of the vehicle and a picture image display function of displaying a picture image captured by an in-vehicle camera (e.g., Japanese Patent Application Laid-open No. 2017-7565).

There has been a demand for achieving such an electronic mirror device with a higher display quality.

An object of the present disclosure is to provide a display device capable of obtaining a high display quality.

SUMMARY

A display device according to the present disclosure includes: a display panel that displays an image; a reflective polarizing layer that transmits a polarization component of incident light in a first direction and reflects a polarization component of the incident light in a second direction different from the first direction; a transparent plate that transmits the incident light; and a retardation film bonded to the transparent plate. The reflective polarizing layer is disposed between the display panel and the retardation film. The retardation film contains polyethylene terephthalate and has a retardation value in a range of 2000 nm or more and 4000 nm or less. An angle between a slow axis of the retardation film and a polarization reflection axis of the reflective polarizing layer is 30 degrees or more and 60 degrees or less.

BRIEF DESCRIPTION OF THE DRAWINGS

FIG. 12 is a view illustrating an example of a result of evaluating a display quality of a mirror image displayed by the electronic mirror device according to the first embodiment;

FIG. 21 is a view illustrating an example of a result of evaluating a display quality of a mirror image displayed by the electronic mirror device according to the second embodiment.

DETAILED DESCRIPTION

First Embodiment

Hereinafter, an electronic mirror device according to a first embodiment of the present disclosure will be described with reference to the drawings.

Outline of Electronic Mirror Device

Figure 1:
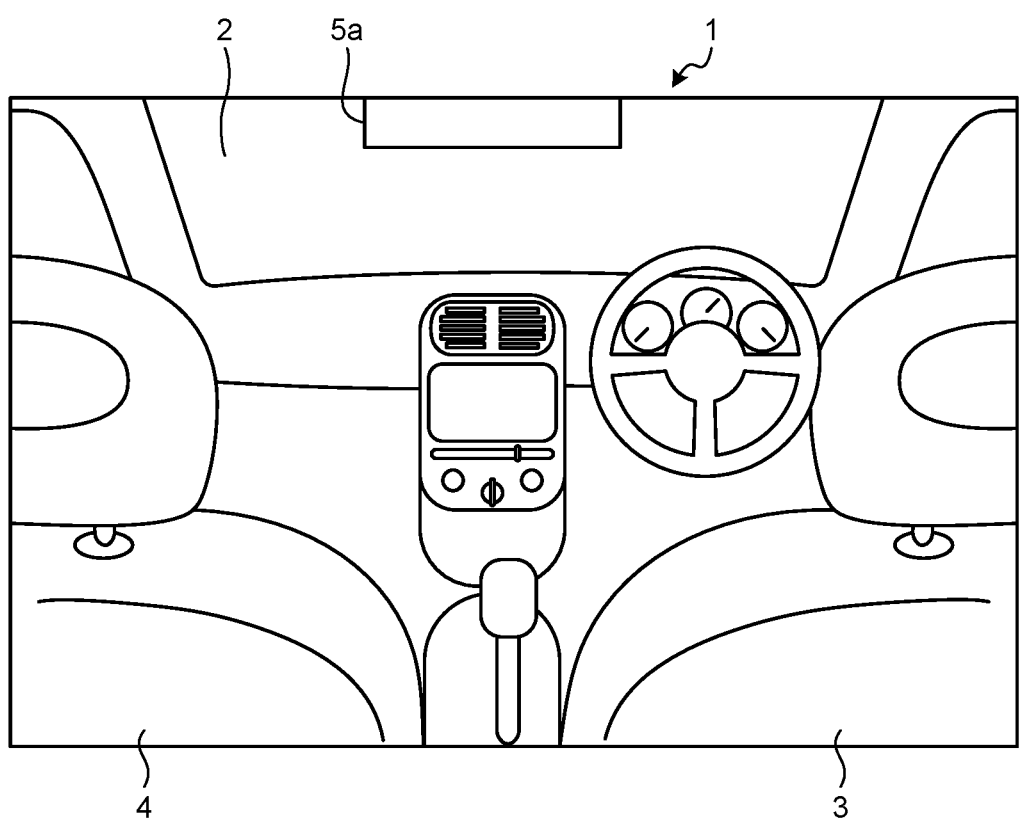
FIG. 1 is a view illustrating an interior of a vehicle in which an electronic mirror device according to a first embodiment is mounted.
Figure 2:
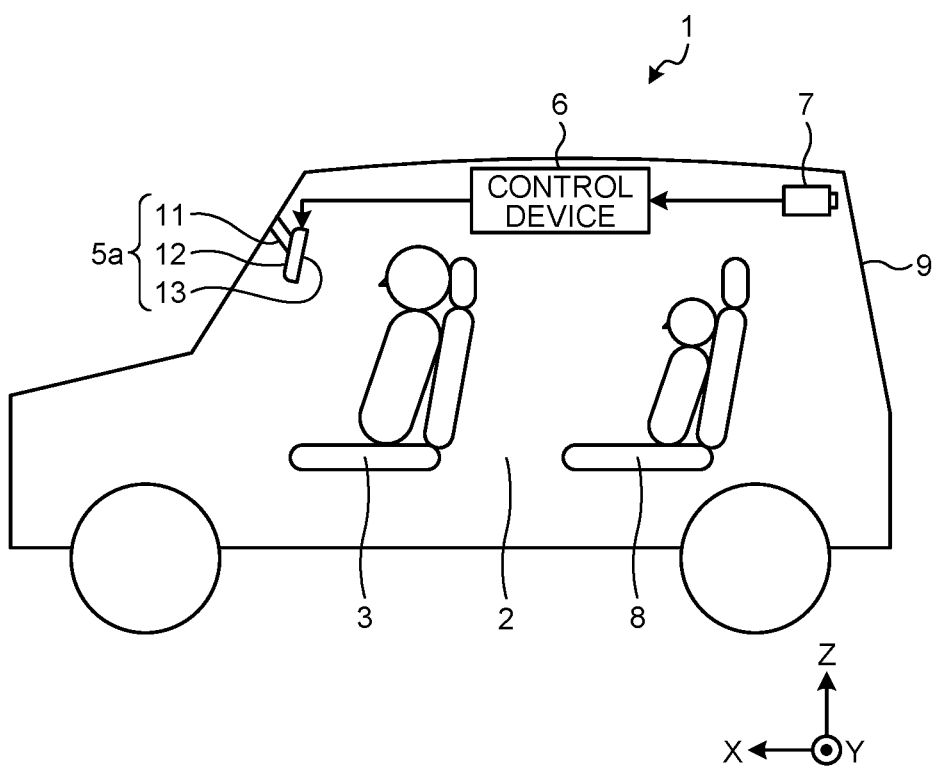
FIG. 2 is a side perspective view schematically illustrating the interior of the vehicle of FIG. 1.

First, an outline of an electronic mirror device 5a included in a vehicle 1 will be described with reference to FIG. 1. FIG. 1 is a view illustrating an interior of the vehicle in which the electronic mirror device according to the first embodiment is mounted. FIG. 2 is a side perspective view schematically illustrating the interior of the vehicle of FIG. 1.

As illustrated in FIG. 2, the electronic mirror device 5a is mounted on the vehicle 1. The electronic mirror device 5a is rotatably attached to an interior 2 of the vehicle 1 by an attachment part 11. More specifically, as illustrated in FIG. 1, the electronic mirror device 5a is mounted at a front end portion of a ceiling between a driver's seat 3 and an assistant driver's seat 4 or the like.

A control device 6 and a camera 7 are connected to the electronic mirror device 5a. The camera 7 is installed at a rear portion of the vehicle 1 to capture an image behind the vehicle 1 through a rear window 9. Then, the camera 7 outputs image data of the obtained image to the control device 6. The control device 6 includes converts an analog image signal input from the camera 7 into a digital image signal by A/D conversion. In addition, the control device 6 outputs the digital image signal to a liquid crystal panel 36 (see FIG. 6), which will be described later. Note that the electronic mirror device 5a is an example of a display device in the present disclosure.

Note that an XYZ coordinate system is set for the following description. The X-axis is an axis that penetrates through the vehicle 1 in a front-rear direction from a rear side to a front side of the vehicle 1. The Y-axis is an axis that penetrates through the vehicle 1 in a left-right direction from a right side to a left side of the vehicle 1. The Z-axis is an axis that penetrates through the vehicle 1 in an up-down direction from a lower side to an upper side of the vehicle 1.

Display Mode of Electronic Mirror Device

Figure 3A:
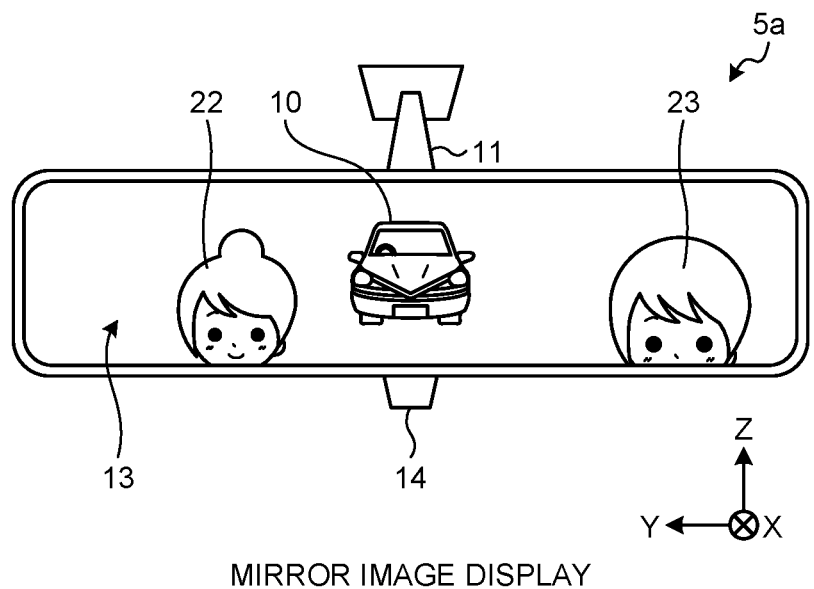
FIG. 3A is a view illustrating an example of a mirror image display as an example of a display mode of the electronic mirror device.
Figure 3B:
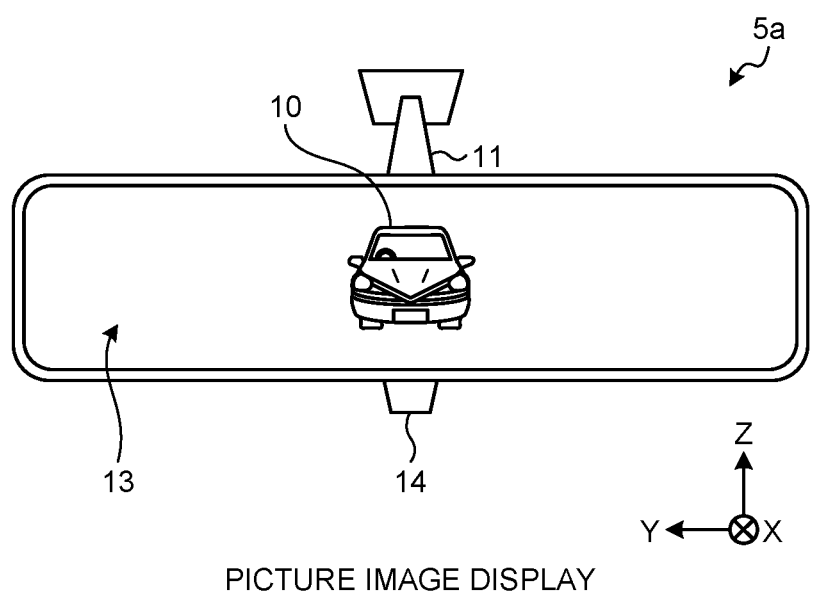
FIG. 3B is a view illustrating an example of a picture image display as an example of a display mode of the electronic mirror device.

Display modes of the electronic mirror device 5a will be described with reference to FIGS. 3A and 3B. FIG. 3A is a view illustrating an example of a mirror image display as an example of a display mode of the electronic mirror device. FIG. 3B is a view illustrating an example of a picture image display as an example of a display mode of the electronic mirror device.

The electronic mirror device 5a performs a mirror image display illustrated in FIG. 3A or a picture image display illustrated in FIG. 3B. Switching between the display modes is performed by operating an operation lever 14. A detailed switching method will be described later (see FIGS. 8 and 9).

The mirror image display refers to a mode in which an image captured by the electronic mirror device 5a from its location toward the rear of the vehicle 1 is displayed on a display surface 13 of the electronic mirror device 5a. During the mirror image display, for example, occupants 22 and 23 seated on rear seats 8 (see FIG. 2) of the vehicle 1 and a vehicle 10 following the vehicle 1 are reflected.

The picture image display refers to a mode in which an image captured by the camera 7 is displayed on the display surface 13 of the electronic mirror device 5a. During the picture image display, for example, the vehicle 10 following the vehicle 1 is reflected. In addition, the occupants 22 and 23 seated on the rear seats 8 of the vehicle 1 are not reflected during the picture image display. Therefore, by selecting the picture image display, the driver can check a state behind the vehicle 1 regardless of the occupants on the rear seats of the vehicle 1 or a loaded state of cargo.

Structure of Electronic Mirror Device

Figure 4:
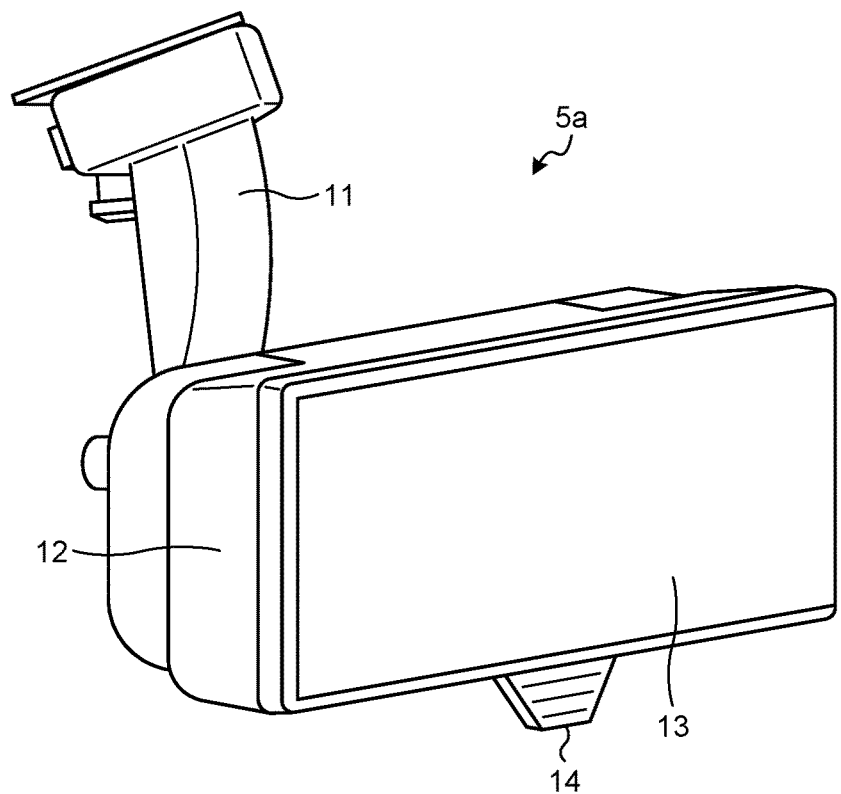
FIG. 4 is an external perspective view of the electronic mirror device according to the first embodiment.
Figure 5:
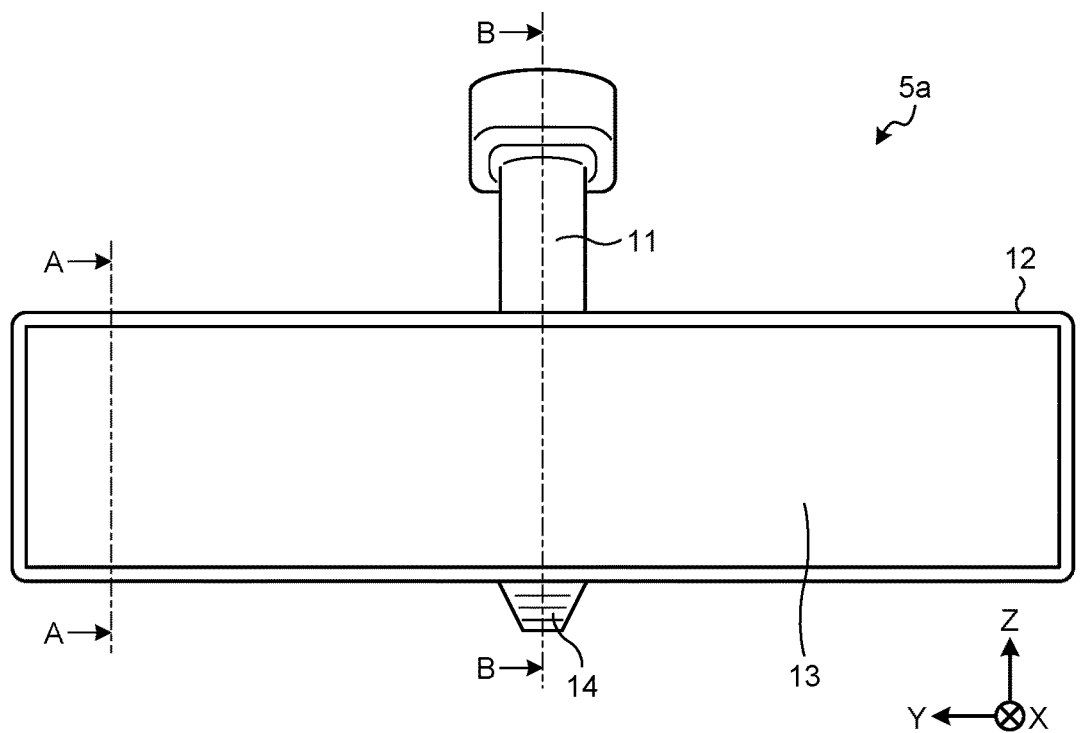
FIG. 5 is a front view of the electronic mirror device according to the first embodiment.
Figure 6:
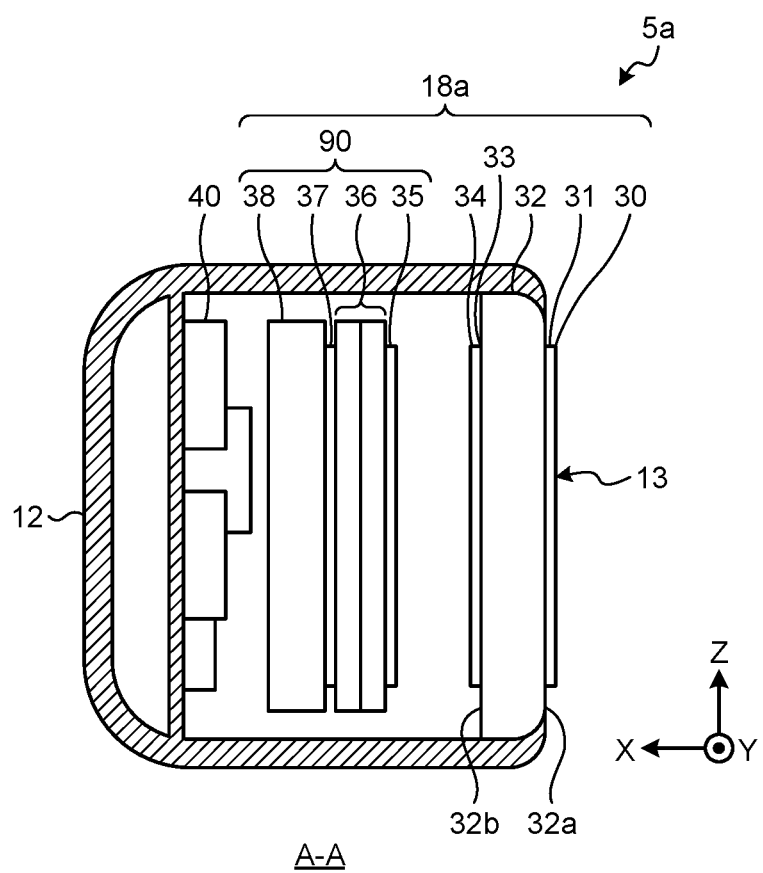
FIG. 6 is a cross-sectional view of the electronic mirror device according to the first embodiment.

A structure of the electronic mirror device 5a will be described with reference to FIGS. 4, 5, and 6. FIG. 4 is an external perspective view of the electronic mirror device according to the first embodiment. FIG. 5 is a front view of the electronic mirror device according to the first embodiment. FIG. 6 is a cross-sectional view of the electronic mirror device according to the first embodiment.

As illustrated in FIG. 4, the electronic mirror device 5a includes a display unit 18a (see FIG. 6), which will be described below, in a housing 12 attached to the vehicle 1 via the attachment part 11. The display surface 13, on which a mirror image or a picture image is displayed, is formed on a driver-facing side of the display unit 18a.

The operation lever 14 is provided under the housing 12. The driver operates the operation lever 14 to switch an orientation of the housing 12 and the display unit 18a of the electronic mirror device 5a between a mode in which a mirror image is displayed and a mode in which a picture image captured by the camera 7 is displayed.

As illustrated in FIG. 5, the display surface 13 has a substantially rectangular shape, with a Y-axis direction being a major axis and a Z-axis direction being a minor axis. Note that the display surface 13 may have an arc shape around each of the four vertexes of the rectangle.

FIG. 6 is a cross-sectional view when the housing 12 is cut along a cutting line A-A illustrated in FIG. 5.

Inside the housing 12, a PET film 30, a glass 32, a linearly reflective polarizing layer 34, and a display panel 90 are disposed in parallel with each other in order toward the positive side of the X axis, that is, from the rear toward the front of the vehicle 1. Note that all structures including the glass 32 may be disposed inside the housing 12. In addition, the glass 32 may be partially or entirely disposed outside the housing 12 by attaching the glass 32 directly to the housing 12 or attaching the glass 32 to the housing 12 via another member.

The glass 32 transmits incident light. A surface of the glass 32 on the negative side of the X axis is referred to as a first surface 32a, and a surface of the glass 32 on the positive side of the X axis is referred to as a second surface 32b. Note that the glass 32 is an example of a transparent plate in the present disclosure. Note that a resin plate may be used instead of the glass 32.

The PET film 30 is a sheet member formed of a resin material including polyethylene terephthalate. The PET film 30 has a retardation value in a range of 2000 nm or more and 4000 nm or less. The retardation value is a value indicating a magnitude of a phase difference between a polarization component along a fast axis of the PET film 30 and a polarization component along a slow axis of the PET film 30. For example, the retardation value of 2000 nm indicates that the phase difference between the polarization component along the fast axis and the polarization component along the slow axis is 2000 nm. In the PET film 30, an angle between the slow axis of the PET film 30 and a polarization reflection axis of the linearly reflective polarizing layer 34 is in a range of 30 degrees or more and 60 degrees or less. The PET film 30 is an example of a retardation film in the present disclosure. The PET film 30 is bonded to the first surface 32a of the glass 32 via an adhesive layer 31. The adhesive layer 31 has a visible light transmittance of 80% or more and an ultraviolet light (UV light) absorptivity of 80% or more. The adhesive layer 31 has a high ultraviolet light absorptivity. Accordingly, it is possible to reduce an amount of ultraviolet light incident on the linearly reflective polarizing layer 34, thereby preventing a deterioration of the linearly reflective polarizing layer 34 caused by the ultraviolet light. The PET film 30 may be bonded to the second surface 32b of the glass 32 via the adhesive layer 31. In this case, the glass 32, the adhesive layer 31, the PET film 30, an adhesive layer 33, and the linearly reflective polarizing layer 34 are disposed in this order toward the positive side of the X axis.

In an environment where the vehicle 1 is traveling, external light is transmitted through the rear window 9 of the vehicle 1 and enters the vehicle interior 2. A polarization component of the external light transmitted through the rear window 9 has a spatial intensity distribution depending on a location of the rear window 9 at which the external light is transmitted, due to a structure of a tempered glass or the like used for the rear window 9. When the electronic mirror device 5a displays a mirror image, the polarization component in one direction having the intensity distribution is reflected by the linearly reflective polarizing layer 34 and visually recognized by the driver. Since the polarization component of the reflected light has an intensity distribution, unevenness in brightness may be visually recognized in the mirror image observed by the driver.

Therefore, the electronic mirror device 5a according to the first embodiment allows light incident from the rear window 9 to pass through the PET film 30 having a retardation value in the range of 2000 nm or more and 4000 nm or less, the PET film 30 being installed on a driver-facing side of the linearly reflective polarizing layer 34, thereby disturbing a deflection direction of the incident light. As a result, the light incident from the rear window 9 becomes a light beam state close to a non-polarized light state in a pseudo manner.

Note that when the electronic mirror device 5a performs a picture image display, unevenness in brightness does not occur in a picture image displayed on the display surface 13. This is because the picture image displayed on the display surface 13 as a picture image captured by the camera 7, is different from a mirror image as an image reflected by the linearly reflective polarizing layer 34.

The linearly reflective polarizing layer 34 is bonded to the second surface 32b of the glass 32 via the adhesive layer 33. The adhesive layer 33 has a visible light transmittance of 80% or more. Note that the adhesive layer 33 does not need to have an ultraviolet light absorptivity of 80% or more, while the adhesive layer 31 described above has an ultraviolet light absorptivity of 80% or more. This makes it possible to widen a range of materials to be selected for the adhesive layer 33. For example, for the adhesive layer 33, a material having an ultraviolet light absorptivity of less than 80% but a high adhesion may be used. This makes it possible to enhance adhesion between the linearly reflective polarizing layer 34 and the glass 32. The adhesive layer 33 may have an ultraviolet light absorptivity of 80% or more. The linearly reflective polarizing layer 34 transmits first deflection light deflected in a first deflection direction out of the light incident from the second surface 32b of the glass 32. That is, the linearly reflective polarizing layer 34 has a polarized light transmitting axis in the first deflection direction. Then, the linearly reflective polarizing layer 34 reflects second deflection light deflected in a second deflection direction different from the first deflection direction. That is, the linearly reflective polarizing layer 34 has a polarization reflection axis in the second deflection direction. In the present embodiment, the first deflection direction and the second deflection direction are orthogonal to each other. As the deflection direction is closer to the first deflection direction, the linearly reflective polarizing layer 34 has a higher light transmittance, and as the deflection direction is farther away from the first deflection direction, the linearly reflective polarizing layer 34 has a lower light transmittance. Similarly, as the deflection direction is closer to the second deflection direction, the linearly reflective polarizing layer 34 has a higher light reflectance, and as the deflection direction is farther away from the second deflection direction, the linearly reflective polarizing layer 34 has a lower light reflectance. The linearly reflective polarizing layer 34 is an example of a reflective polarizing layer in the present disclosure.

The polarization reflection axis in the second direction of the linearly reflective polarizing layer 34 and the slow axis of the PET film 30 form an angle of 30 degrees or more and 60 degrees or less therebetween. By arranging the slow axis of the PET film 30 and the polarization reflection axis of the linearly reflective polarizing layer 34 at an angle of 30 degrees or more and 60 degrees or less therebetween, it is possible to increase a reflectance when a light beam having passed through the PET film 30 is reflected by the linearly reflective polarizing layer 34.

The display panel 90 displays image information to be mirrored on the display surface 13. The display panel 90 constitutes a general liquid crystal monitor. That is, the display panel 90 includes a first polarizer 35, a liquid crystal panel 36, a second polarizer 37, and a backlight 38. Note that the image information displayed on the display panel 90 may be a still image or a moving image. In addition, the display of the image information may be a monochrome display or a color display. In addition, the display panel 90 may be an organic electro-luminescence (EL) display.

The first polarizer 35 emits light having a linear polarization component in the first direction. That is, the first polarizer 35 has a transmission axis in the first direction. Note that the transmission axis direction as the first direction coincides with the transmission axis direction of the linearly reflective polarizing layer 34 described above.

The liquid crystal panel 36 displays a digital image signal generated by the control device 6. In addition, the liquid crystal panel 36 changes linearly polarized light incident from the second polarizer 37 to a polarization state corresponding to a birefringence of a liquid crystal while propagating the incident light in a thickness direction of the liquid crystal panel 36. Then, out of the light emitted from the liquid crystal panel 36, only a polarization component that coincides with the transmission axis of the first polarizer 35 is emitted after being transmitted through the first polarizer 35. The liquid crystal panel 36 changes a direction in which the liquid crystal is oriented by applying a voltage to electrodes provided on both surfaces of the liquid crystal panel 36 although not illustrated in FIG. 6. Accordingly, the transmittance of the liquid crystal panel 36 changes, and thus, the brightness of the emitted light changes. Note that the liquid crystal panel 36 is an example of a display panel in the present disclosure.

The second polarizer 37 transmits only a specific polarization component as linearly polarized light out of light emitted from the backlight 38.

For example, the backlight 38 includes an LED to illuminate the liquid crystal panel 36 toward its back surface side, that is, toward the positive side of the X axis.

Note that a detailed operation of the display panel 90 follows a known principle of operating a liquid crystal monitor, and thus, a more detailed description thereof will be omitted.

A drive control circuit 40 is installed further inside than the backlight 38, that is, to face the positive side of the X axis of the backlight 38. The drive control circuit 40 performs a driving control of the display panel 90.

In FIG. 6, there is a gap of about several millimeters (mm) between the glass 32 and the display panel 90. This is to prevent a breakage due to contact between the glass 32 and the display panel 90 when the electronic mirror device 5a vibrates due to vibrations generated when the vehicle 1 travels.

Outline of Operation of Electronic Mirror Device

Figure 7:
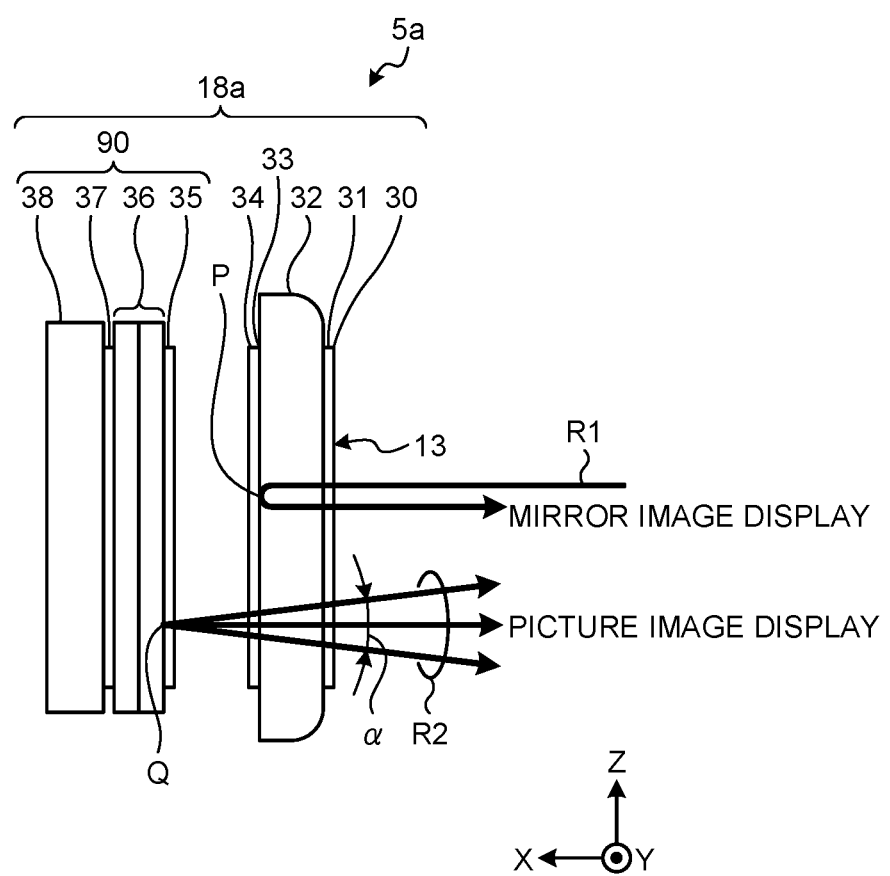
FIG. 7 is a view illustrating a movement of a light beam in a case where the electronic mirror device according to the first embodiment performs a mirror image display and a movement of a light beam in a case where the electronic mirror device according to the first embodiment performs a picture image display.
Figure 8:
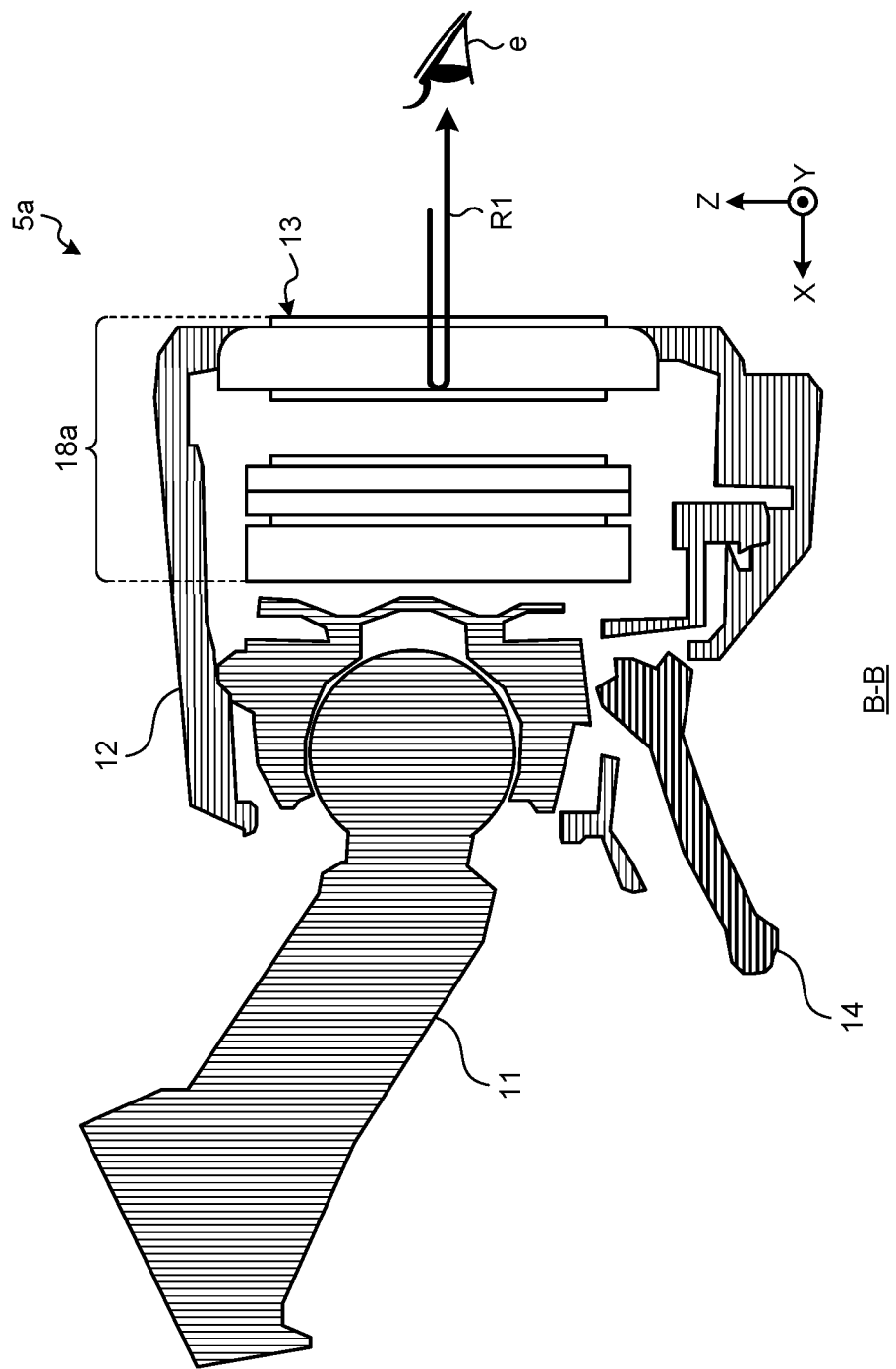
FIG. 8 is a cross-sectional view illustrating a state of the electronic mirror device according to the first embodiment when the electronic mirror device performs a mirror image display.
Figure 9:
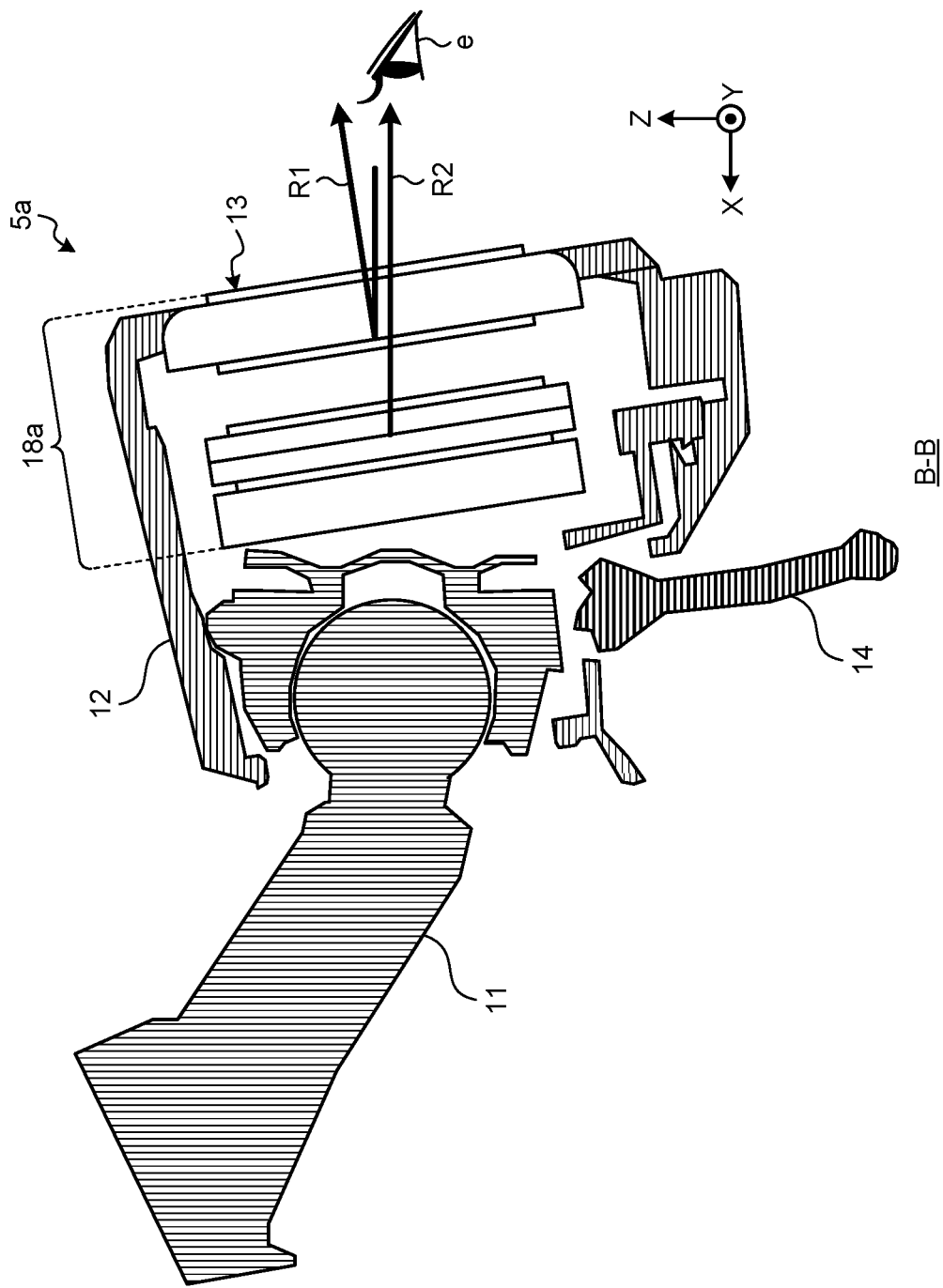
FIG. 9 is a cross-sectional view illustrating a state of the electronic mirror device according to the first embodiment when the electronic mirror device performs a picture image display.

An outline of an operation of the electronic mirror device 5a will be described with reference to FIGS. 7, 8, and 9. FIG. 7 is a view illustrating a movement of a light beam in a case where the electronic mirror device according to the first embodiment performs a mirror image display and a movement of a light beam in a case where the electronic mirror device according to the first embodiment performs a picture image display. FIG. 8 is a cross-sectional view illustrating a state of the electronic mirror device according to the first embodiment when the electronic mirror device performs a mirror image display. FIG. 9 is a cross-sectional view illustrating a state of the electronic mirror device according to the first embodiment when the electronic mirror device performs a picture image display.

In FIG. 7, when a picture image display is not performed on the liquid crystal panel 36 of the electronic mirror device 5a, an image of the rear of the vehicle 1 is transmitted through the PET film 30 and the glass 32 and reaches the linearly reflective polarizing layer 34 as a light beam R1. Then, the light beam R1 is specularly reflected by the linearly reflective polarizing layer 34. The specularly reflected light beam R1 is transmitted through the glass 32 and the PET film 30, and is emitted from the display surface 13 in the negative direction of the X axis. The driver of the vehicle 1 observes the image of the rear of the vehicle 1 as a mirror image by visually recognizing the light beam R1 emitted from the display surface 13.

On the other hand, when the electronic mirror device 5a performs a picture image display on the liquid crystal panel 36, a light beam R2 emitted from the liquid crystal panel 36 is transmitted through the linearly reflective polarizing layer 34, the glass 32, and the PET film 30, and is emitted from the display surface 13 in the negative direction of the X axis. Note that the light beam R2 is emitted over a specific angle range. The driver of the vehicle 1 observes an image captured by the camera 7 by visually recognizing the light beam R2 emitted over a specific viewing angle α.

In this way, the linearly reflective polarizing layer 34 functions as a half mirror that reflects the light beam R1 and transmits the light beam R2.

In FIG. 7, when a picture image is displayed on the liquid crystal panel 36, the light beam R1 specularly reflected by the linearly reflective polarizing layer 34 and the light beam R2 caused by the picture image displayed on the liquid crystal panel 36 are simultaneously generated, and thus, there is a possibility that the driver observing the display surface 13 visually recognizes a mirror image display and a picture image display at the same time. Therefore, the electronic mirror device 5a does not perform a picture image display on the liquid crystal panel 36 when performing a mirror image display. When a picture image display is performed, that is, when a picture image is displayed on the liquid crystal panel 36, the driver may visually recognize only the light beam R2 by changing a direction of the display surface 13. This will be described in detail later (see FIGS. 8 and 9).

FIGS. 8 and 9 are cross-sectional views each illustrating the electronic mirror device 5a taken along line B-B of FIG. 5. In FIGS. 8 and 9, the operation lever 14 integrally changes an inclination of the housing 12 and the display unit 18a.

That is, in an example of FIG. 8, by tilting the operation lever 14 toward the positive side of the X axis, a normal direction of the display surface 13 of the display unit 18a is adjusted to a direction in which a mirror image of the rear of the vehicle 1, that is, the light beam R1, reaches an eyeball e of the driver. In addition, in an example of FIG. 9, by tilting the operation lever 14 toward the negative side of the X axis, a normal direction of the display surface 13 of the display unit 18a is adjusted to a direction in which a mirror image of the rear of the vehicle 1, that is, the light beam R1, does not reach an eyeball e of the driver.

In a case where the electronic mirror device 5a is in the state of FIG. 9, when a picture image is displayed on the liquid crystal panel 36 (see FIG. 7) of the display unit 18a, the light beam R2 emitted from the picture image reaches the eyeball e of the driver. That is, the driver can visually recognize the picture image displayed on the liquid crystal panel 36.

In order to prevent the driver from simultaneously observing a mirror image display and a picture image display, the electronic mirror device 5a performs the picture image display on the liquid crystal panel 36 and turns on the backlight 38 only when the operation lever 14 is in the state of FIG. 9.

In addition, the operation lever 14 is not limited to the lever shape as long as a posture of the display unit 18a can be switched. For example, the operation lever 14 may have a button shape. Although it is illustrated in FIGS. 8 and 9 as an example that the posture of the display unit 18a is switched by integrally changing the inclination of the housing 12 and the display unit 18a using the operation lever 14, the operation lever 14 may be configured to switch only the posture of the display unit 18a without changing the inclination of the housing 12. In this case, the operation lever 14 may be directly connected to the display unit 18a to switch the posture of the display unit 18a.

Characteristics of PET Film

Figure 10:
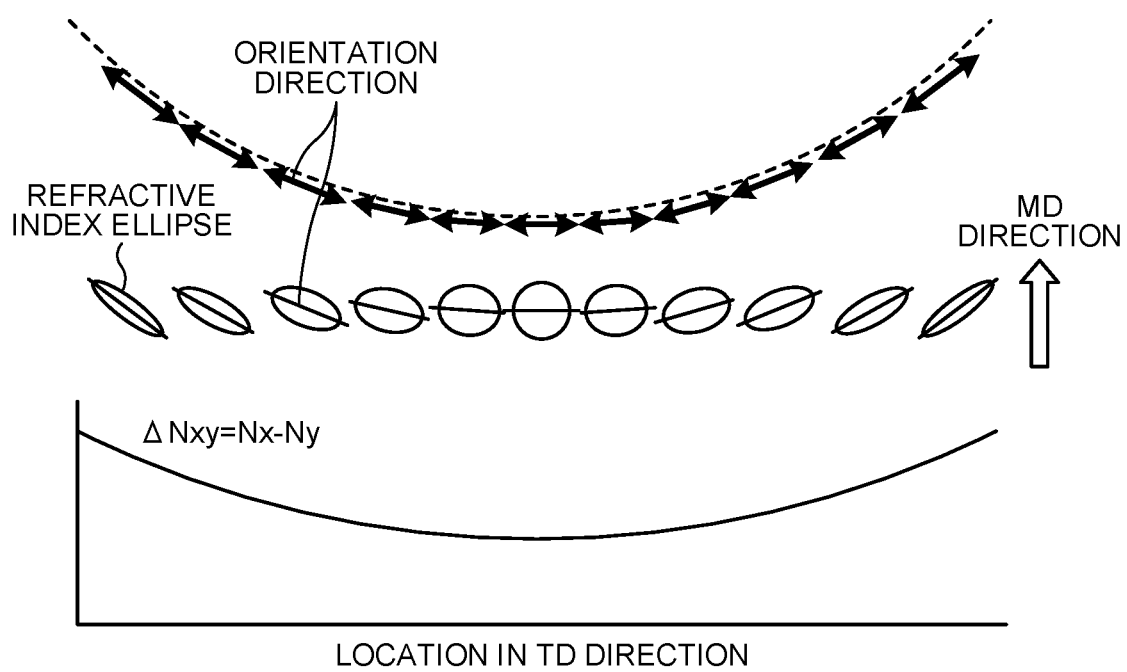
FIG. 10 is a view illustrating an orientation direction and a refractive index distribution of a PET film produced by sequential biaxial stretching.

Characteristics of the PET film 30 will be described with reference to FIG. 10. FIG. 10 is a view illustrating an orientation direction and a refractive index distribution of the PET film produced by sequential biaxial stretching.

The PET film 30 is manufactured by so-called sequential biaxial stretching in which a molten resin material is stretched in two axial directions orthogonal to each other. In the middle of manufacturing the PET film 30, the PET film 30 is stretched in a transverse direction which is a width direction of the PET film 30, that is, a so-called TD direction, and in a longitudinal direction which is a length direction of the PET film 30, that is, a so-called MD direction. As a result, a deviation toward a stretched direction occurs in a direction in which molecules of the resin material constituting the PET film 30 are oriented.

The direction in which the molecules of the resin material are oriented at each location of the PET film 30 in the TD direction is illustrated in FIG. 10. At the center of the PET film 30 in the TD direction, the orientation direction is horizontal with respect to the TD direction. This is because, for example, in a case where the PET film 30 is stretched in a state where both ends of the PET film 30 are gripped with clips, the PET film 30 is strongly stretched in the TD direction around the center in the width direction thereof. On the other hand, an inclination of the direction in which the molecular of the resin material constituting the PET film 30 is oriented from the TD direction increases toward the ends of the PET film 30.

In the PET film 30 produced by sequential biaxial stretching, a refractive index in a direction in which the PET film 30 has a largest refractive index is defined as Nx, and a refractive index in a direction orthogonal to the direction in which the PET film 30 has a largest refractive index is defined as Ny. The direction in which the PET film 30 has a largest refractive index is referred to as a slow axis. A difference between the refractive index Nx and the refractive index Ny is referred to as a birefringence ΔNxy. Here, the birefringence ΔNxy at each location of the PET film 30 in the TD direction is represented as illustrated in FIG. 10. The birefringence ΔNxy is small around the center of the PET film 30 in the width direction, and the birefringence ΔNxy is large around the both ends of the PET film 30 in the width direction. Also, the slow axis is formed in the TD direction around the center of the PET film 30 in the width direction, whereas the slow axis is inclined from the TD direction toward the MD direction around the both ends of the PET film 30 in the width direction. Here, as illustrated in FIG. 10, a refractive index ellipse formed by the refractive index Nx and the refractive index Ny has a shape corresponding to a location of the PET film 30 in the TD direction. A major-axis direction of the refractive index ellipse, that is, the slow axis, corresponds to a direction in which the resin material is oriented at the TD position.

Changes in the inclination of the orientation direction, that is, changes in the inclination of the slow axis, are bilaterally symmetrical with respect to the center position of the PET film 30 in the TD direction. Accordingly, shapes of refractive index ellipses are also symmetrical with respect to the center position of the PET film 30 in the TD direction.

The birefringence ΔNxy is represented by Formula (1).

$$\Delta Nxy = Nx - Ny \qquad (1)$$

In addition, a retardation value Re is a product of the birefringence ΔNxy and a thickness d of the PET film 30, that is, represented by Formula (2).

$$Re = \Delta Nxy \times d \qquad (2)$$

That is, when the thickness d of the PET film 30 is constant regardless of location, the retardation value Re varies depending on location in the TD direction. Specifically, the retardation value Re is small around the center of the PET film 30 in the TD direction, and the retardation value Re is large around the both ends of the PET film 30 in the TD direction. This means that a direction in which the PET film 30 is stretched and a direction in which molecules of the resin material, that is, a slow axis direction, vary depending on the location of the PET film 30 in the TD direction.

Method for Cutting Out PET Film

Figure 11:
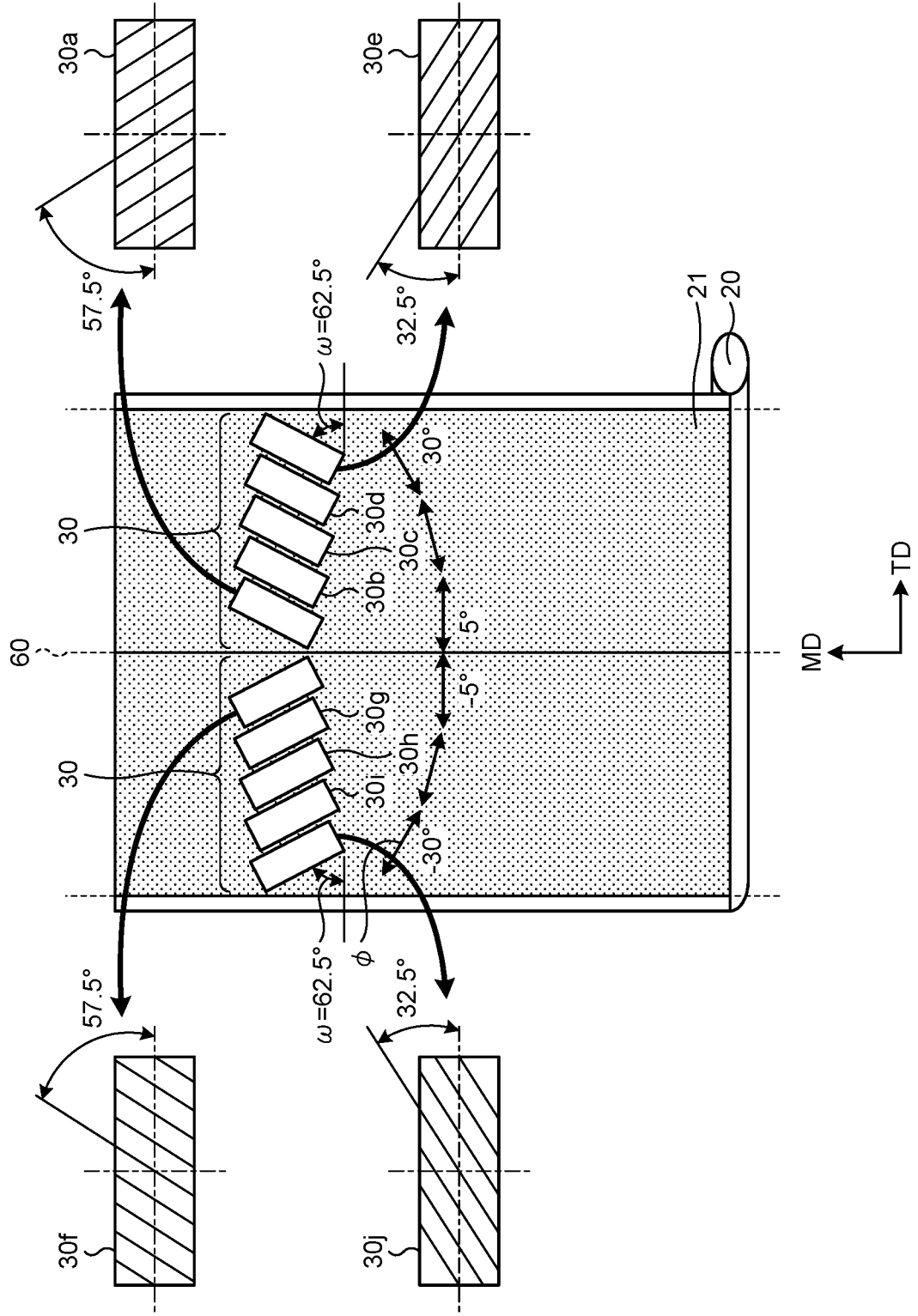
FIG. 11 is a view illustrating a method for cutting out a PET film to be used in the electronic mirror device according to the first embodiment.

A method for cutting out a PET film 30 will be described with reference to FIG. 11. FIG. 11 is a view illustrating a method for cutting out a PET film to be used in the electronic mirror device according to the first embodiment.

As illustrated in FIG. 11, the PET film 30 is manufactured by unrolling a sheet 21 from a roll 20, around which the sheet 21 manufactured by sequential biaxial stretching is wound, and cutting out a PET film 30 having a size to be bonded to the glass 32 constituting the electronic mirror device 5a from the sheet 21. Note that the sheet 21 is an example of a sheet-shaped retardation film.

By cutting out a PET film 30 using a method to be described below, when the PET film 30 is arranged together with the linearly reflective polarizing layer 34 in the electronic mirror device, the slow axis of the PET film 30 and the polarization reflection axis of the linearly reflective polarizing layer 34 can be arranged at an angle of 30 degrees or more and 60 degrees or less therebetween.

A PET film 30a, a PET film 30b, a PET film 30c, a PET film 30d, a PET film 30e, a PET film 30f, a PET film 30g, a PET film 30h, a PET film 30i, and a PET film 30j illustrated in FIG. 11 are examples of PET films cut out from the same location of the sheet in the MD direction. An angle φ at which the molecules of the resin material are oriented varies depending on the location of the sheet 21 in the TD direction. In the example of FIG. 11, at a location near a center line 60 indicating the center of the sheet 21 in the TD direction, the orientation angle φ is about ±5 degrees with respect to the TD direction. At a location of an end in the TD direction, the orientation angle φ is about ±30 degrees with respect to the TD direction.

Here, the PET film 30 is cut out at the orientation angle φ of the sheet 21 in the TD direction, that is, an angle corresponding to the slow axis direction.

More specifically, the PET film 30 is cut out at a cutout angle ω of 62.5 degrees in the counterclockwise direction with respect to the TD direction in a region on the right side of the center line 60 in the TD direction of the sheet 21. In addition, the PET film 30 is cut out at a cutout angle ω of 62.5 degrees in the clockwise direction with respect to the TD direction in a region on the left side of the center line 60 of the sheet 21.

Here, for example, as illustrated in FIG. 11, the PET film 30a cut out from the sheet 21 near the center line 60 on the right side thereof has an orientation angle φ of 57.5 degrees in the clockwise direction with respect to the longitudinal direction of the PET film 30a. Therefore, in the electronic mirror device 5a, when the linearly reflective polarizing layer 34 having a polarization reflection axis, for example, in the horizontal direction, that is, at 0 degrees, and the PET film 30a are disposed as illustrated in FIG. 6, an angle between the slow axis of the PET film 30a and the polarization reflection axis of the linearly reflective polarizing layer 34 is 57.5 degrees in the clockwise direction. Therefore, over the entire area of the PET film 30a, the angle between the slow axis of the PET film 30a and the polarization reflection axis of the linearly reflective polarizing layer 34 is within the range of 30 degrees or more and 60 degrees or less.

As illustrated in FIG. 11, the PET film 30e cut out from the sheet 21 at a right end thereof has an orientation angle φ of 32.5 degrees in the clockwise direction with respect to the longitudinal direction of the PET film 30e. Therefore, in the electronic mirror device 5a, when the linearly reflective polarizing layer 34 having a polarization reflection axis, for example, in the horizontal direction, that is, at 0 degrees, and the PET film 30e are disposed as illustrated in FIG. 6, an angle between the slow axis of the PET film 30e and the polarization reflection axis of the linearly reflective polarizing layer 34 is 32.5 degrees in the clockwise direction. Therefore, over the entire area of the PET film 30e, the angle between the slow axis of the PET film 30e and the polarization reflection axis of the linearly reflective polarizing layer 34 is within the range of 30 degrees or more and 60 degrees or less.

In addition, as illustrated in FIG. 11, the PET film 30f cut out from the sheet 21 near the center line 60 on the left side thereof has an orientation angle φ of 57.5 degrees in the counterclockwise direction with respect to the longitudinal direction of the PET film 30f. Therefore, in the electronic mirror device 5a, when the linearly reflective polarizing layer 34 having a polarization reflection axis, for example, in the horizontal direction, that is, at 0 degrees, and the PET film 30f are disposed as illustrated in FIG. 6, an angle between the slow axis of the PET film 30f and the polarization reflection axis of the linearly reflective polarizing layer 34 is 57.5 degrees in the counterclockwise direction. Therefore, over the entire area of the PET film 30f, the angle between the slow axis of the PET film 30f and the polarization reflection axis of the linearly reflective polarizing layer 34 is within the range of 30 degrees or more and 60 degrees or less.

As illustrated in FIG. 11, the PET film 30j cut out from the sheet 21 at a left end thereof has an orientation angle φ of 32.5 degrees in the counterclockwise direction with respect to the longitudinal direction of the PET film 30j. Therefore, in the electronic mirror device 5a, when the linearly reflective polarizing layer 34 having a polarization reflection axis, for example, in the horizontal direction, that is, at 0 degrees, and the PET film 30j are disposed as illustrated in FIG. 6, an angle between the slow axis of the PET film 30j and the polarization reflection axis of the linearly reflective polarizing layer 34 is 32.5 degrees in the counterclockwise direction. Therefore, the angle between the slow axis of the PET film 30j and the polarization reflection axis of the linearly reflective polarizing layer 34 over the entire area is within the range of 30 degrees or more and 60 degrees or less.

Although the PET film 30b, the PET film 30c, the PET film 30d, the PET film 30g, the PET film 30h, and the PET film 30i are not described, a slow axis of each of these PET films also forms an angle in the range of 30 degrees or more and 60 degrees or less with the polarization reflection axis of the linearly reflective polarizing layer 34 over the entire area of the PET film since the orientation angle φ continuously changes along the TD direction.

Since the orientation angle φ of the sheet 21 along the TD direction varies depending on the composition of the material used for the sheet 21, the stretching conditions when the sheet 21 is produced, and the like, the PET film 30 is cut out at a cutout angle ω set according to these conditions. In addition, it is exemplified in FIG. 11 that ten PET films 30 are cut out along the TD direction from the same location of the sheet 21 in the MD direction, but this is an example, and the number of PET films 30 cut out from the same location of the sheet 21 in the MD direction is set according to the width of the sheet 21.

Evaluation of Display Quality of Mirror Image Displayed by Electronic Mirror Device According to First Embodiment A result of evaluating a display quality of a mirror image displayed by the electronic mirror device 5a according to the first embodiment will be described with reference to FIG. 12. FIG. 12 is a view illustrating an example of a result of evaluating a display quality of a mirror image displayed by the electronic mirror device according to the first embodiment.

The inventors evaluated whether a mirror image had uneven brightness when displayed on the display surface 13 of the electronic mirror device 5a, for three types of sequentially biaxially stretched PET films according to the present embodiment, that is, a PET film A (having a retardation value Re of 2030 nm), a PET film B (having a retardation value Re of 2920 nm), and a PET film C (having a retardation value Re of 3890 nm). Similarly, for three types of sequentially biaxially stretched PET films as comparative examples, that is, a PET film D (having a retardation value Re of 980 nm), a PET film E (having a retardation value Re of 1420 nm), and a PET film F (having a retardation value Re of 1860 nm), and for a case where no PET film was used, the inventors evaluated whether a mirror image had uneven brightness when displayed on the display surface 13 of the electronic mirror device 5a.

As a result, when each of the three kinds of PET films according to the present embodiment, i.e. the PET films A, B, and C, was used in the electronic mirror device 5a, no unevenness in brightness was observed, thereby confirming a high display quality. On the other hand, when each of the PET films D and E was used in the electronic mirror device 5a or when no PET film was used in the electronic mirror device 5a as a comparative example, unevenness in brightness was observed. When the PET film F was used in the electronic mirror device 5a as a comparative example, slight unevenness in brightness was observed. As described above, it was confirmed that the display quality was high when the PET film according to the present embodiment was used.

As described above, it was confirmed that the PET film having a retardation value Re in a range of 2000 nm or more and 4000 nm or less according to the present embodiment makes it possible to display a mirror image with high display quality. Note that, even when a film having a retardation value Re of more than 4000 nm is used, it is possible to display a mirror image with high display quality, but the retardation film having a retardation value Re of more than 4000 nm, which is generally called an ultra-high retardation film or the like, needs to be manufactured by a manufacturing method different from the above-described sequential biaxial stretching, resulting in an increase in cost. Therefore, in order to provide a low-cost display device, it is preferable to use a PET film having a retardation value Re in a range of 2000 nm or more and 4000 nm or less.

Effect of First Embodiment

As described above, an electronic mirror device 5a according to the first embodiment includes: a liquid crystal panel 36 that displays an image; a linearly reflective polarizing layer 34 that transmits a polarization component of incident light in a first direction and reflects a polarization component of the incident light in a second direction different from the first direction; a glass 32 that transmits the incident light; and a PET film 30 bonded to the glass 32, wherein the linearly reflective polarizing layer 34 is disposed between the liquid crystal panel 36 and the PET film 30, the PET film 30 contains polyethylene terephthalate and has a retardation value Re in a range of 2000 nm or more and 4000 nm or less, and an angle between a slow axis of the PET film 30 and a polarization reflection axis of the linearly reflective polarizing layer 34 is 30 degrees or more and 60 degrees or less. Therefore, it is possible to improve a display quality of an image reflected from the linearly reflective polarizing layer 34, that is, a mirror image.

In the electronic mirror device 5a according to the first embodiment, the glass 32 has a first surface 32a and a second surface 32b located closer to the liquid crystal panel 36 than the first surface 32a, the linearly reflective polarizing layer 34 is bonded to the second surface 32b, and the PET film 30 is bonded to the first surface 32a. Therefore, it is possible to improve a display quality of an image reflected by the linearly reflective polarizing layer 34 having a constant reflectance, that is, a mirror image. In addition, since the PET film 30 is bonded to the first surface 32a which is a front surface side of the glass 32, it is possible to prevent fragments of the glass 32 from scattering when the glass 32 is broken.

Further, in the electronic mirror device 5a according to the first embodiment, the PET film 30 is cut out from a sheet-shaped retardation film manufactured by biaxial stretching at an angle corresponding to an amount of change in slow axis direction of the sheet-shaped retardation film in a width direction thereof, and an angle between the slow axis of the cut-out PET film 30 and the polarization reflection axis of the linearly reflective polarizing layer 34 is 30 degrees or more and 60 degrees or less. Therefore, it is possible to set the angle between the slow axis of the cut-out PET film 30 and the polarization reflection axis of the linearly reflective polarizing layer 34 to 30 degrees or more and 60 degrees or less in an easy and reliable manner.

In addition, in the electronic mirror device 5a according to the first embodiment, the PET film 30 is bonded to the glass 32 via an adhesive layer 31 having a transmittance of 80% or more and an ultraviolet light absorptivity of 80% or more. Therefore, it is possible to reduce a deterioration of the linearly reflective polarizing layer 34 due to ultraviolet light.

Second Embodiment

Figure 13:
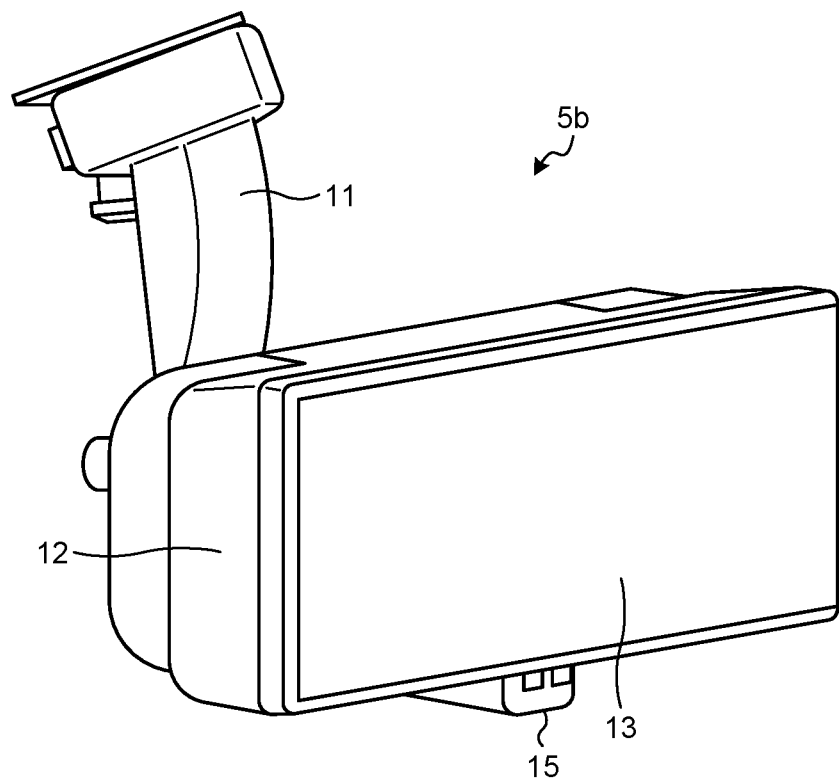
FIG. 13 is an external perspective view of an electronic mirror device according to a second embodiment.
Figure 14:
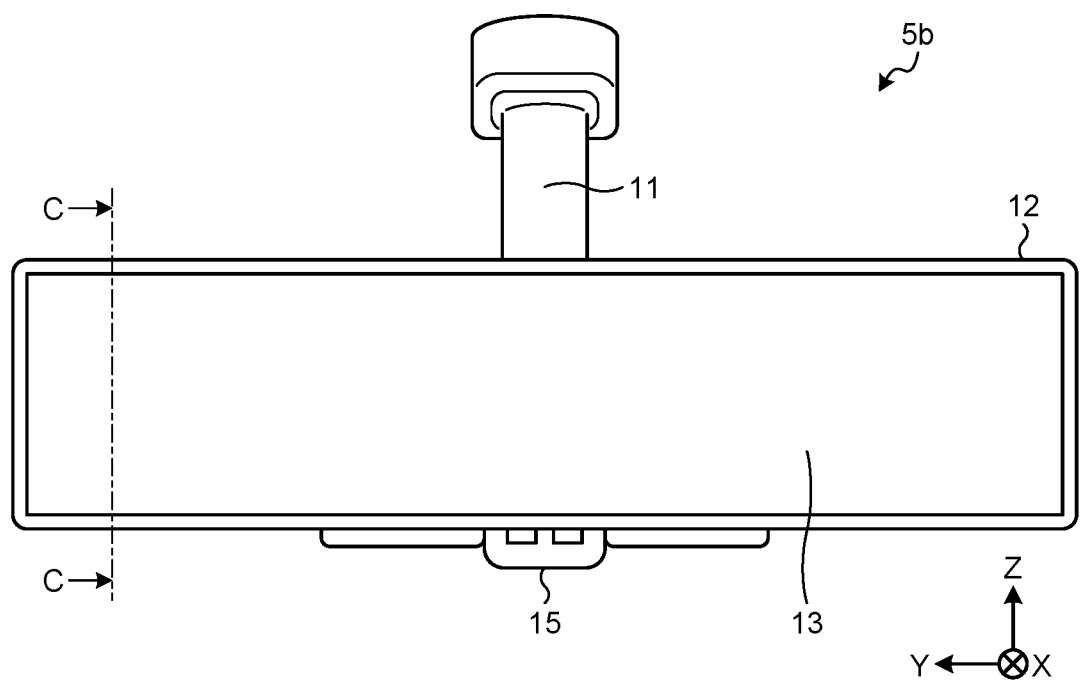
FIG. 14 is a front view of the electronic mirror device according to the second embodiment.
Figure 15:
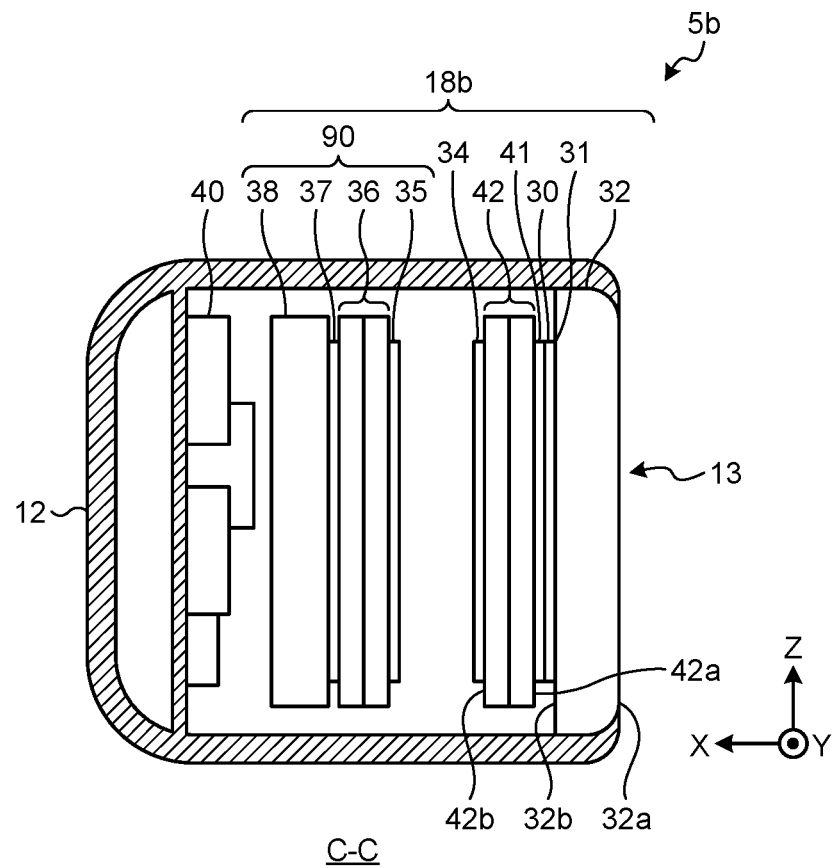
FIG. 15 is a cross-sectional view of the electronic mirror device according to the second embodiment.

Hereinafter, an electronic mirror device according to a second embodiment of the present disclosure will be described with reference to the drawings.
Structure of Electronic Mirror Device A structure of an electronic mirror device 5b will be described with reference to FIGS. 13, 14, and 15. FIG. 13 is an external perspective view of the electronic mirror device according to the second embodiment. FIG. 14 is a front view of the electronic mirror device according to the second embodiment. FIG. 15 is a cross-sectional view of the electronic mirror device according to the second embodiment.

As illustrated in FIG. 13, the electronic mirror device 5b includes a display unit 18b (see FIG. 15), which will be described below, in the housing 12 attached to the vehicle 1 via the attachment part 11. The display surface 13, on which a mirror image or a picture image is displayed, is formed on a driver-facing side of the display unit 18b. Note that the electronic mirror device 5b is an example of a display device in the present disclosure.

An operation unit 15 is provided under the housing 12. The driver selects whether to display a mirror image or a picture image captured by the camera 7 on the display surface 13 of the electronic mirror device 5b by operating the operation unit 15.

As illustrated in FIG. 14, the display surface 13 has a substantially rectangular shape, with a Y-axis direction being a major axis and a Z-axis direction being a minor axis. Note that the display surface 13 may have an arc shape around each of the four vertexes of the rectangle.

FIG. 15 is a cross-sectional view when the housing 12 is cut along a cutting line C-C illustrated in FIG. 14.

Inside the housing 12, a glass 32, an adhesive layer 31, a PET film 30, a linearly polarized light absorbing layer 41, a TN liquid crystal panel 42, a linearly reflective polarizing layer 34, and a display panel 90 are disposed in parallel with each other in order toward the positive side of the X axis, that is, from the rear toward the front of the vehicle 1.

The glass 32 is the same as the glass 32 included in the electronic mirror device 5a described in the first embodiment. Note that a surface of the glass 32 on the negative side of the X axis is referred to as the first surface 32a, and a surface of the glass 32 on the positive side of the X axis is referred to as the second surface 32b. The glass 32 is an example of a transparent plate in the present disclosure.

The PET film 30 is the same as the PET film 30 included in the electronic mirror device 5a described in the first embodiment. The PET film 30 has a retardation value Re in a range of 2000 nm or more and 4000 nm or less. In the PET film 30, an angle between the slow axis of the PET film 30 and a polarization reflection axis of the linearly reflective polarizing layer 34 is in a range of 30 degrees or more and 60 degrees or less. The PET film 30 is an example of a retardation film in the present disclosure. The PET film 30 is bonded to the second surface 32b of the glass 32 via the adhesive layer 31. The adhesive layer 31 is the same as that described in the first embodiment. The PET film 30 may be bonded to the first surface 32a of the glass 32 via the adhesive layer 31. In this case, the PET film 30, the adhesive layer 31, the glass 32, and the linearly polarized light absorbing layer 41 are disposed in this order toward the positive side of the X axis.

The electronic mirror device 5b according to the second embodiment allows light incident from the rear window 9 (see FIG. 2) to pass through the PET film 30 having a retardation value Re in the range from 2000 nm or more and 4000 nm or less, thereby disturbing a deflection direction of the incident light. As a result, the light incident from the rear window 9 becomes a light beam state close to a non-polarized light state in a pseudo manner.

The linearly polarized light absorbing layer 41 transmits first deflection light deflected in a first deflection direction, and absorbs second deflection light deflected in a second deflection direction different from the first deflection direction. Note that the first deflection direction of the linearly polarized light absorbing layer 41, that is, the transmission axis, is disposed to be orthogonal to the polarization reflection axis of the linearly reflective polarizing layer 34. In addition, in the present embodiment, the first deflection direction and the second deflection direction are orthogonal to each other. As the deflection direction is closer to the first deflection direction, the linearly polarized light absorbing layer 41 has a higher light transmittance, and as the deflection direction is farther away from the first deflection direction, the linearly polarized light absorbing layer 41 has a lower light transmittance. Similarly, as the deflection direction is closer to the second deflection direction, the linearly polarized light absorbing layer 41 has a higher light absorptivity, and as the deflection direction is farther away from the second deflection direction, the linearly polarized light absorbing layer 41 has a lower light absorptivity. Note that the first deflection direction and the second deflection direction may not be orthogonal to each other. The linearly polarized light absorbing layer 41 is an example of a polarizer in the present disclosure.

The TN liquid crystal panel 42 is a panel to which a voltage is applied from the outside, so that a reflectance and a transmittance of the TN liquid crystal panel 42 can be changed. Note that the TN liquid crystal panel 42 is an example of a reflectance control panel in the present disclosure. More specifically, when the electronic mirror device 5b performs a mirror image display, the TN liquid crystal panel 42 increases a reflectance with respect to light incident from the negative side of the X axis, and decreases a transmittance with respect to light incident from the positive side of the X axis. Also, when the electronic mirror device 5b performs a picture image display, the TN liquid crystal panel 42 decreases a reflectance with respect to light incident from the negative side of the X axis, and increases a transmittance with respect to light incident from the positive side of the X axis. A mechanism by which the TN liquid crystal panel 42 changes the reflectance and the transmittance will be described in detail later (see FIGS. 17, 18, and 19). The linearly polarized light absorbing layer 41 is bonded to a first surface 42a of the TN liquid crystal panel 42 which is a surface on the negative side of the X axis. The linearly reflective polarizing layer 34 is bonded to a second surface 42b of the TN liquid crystal panel 42 which is a surface on the positive side of the X axis. Note that the electronic mirror device 5b may include an EC panel instead of the TN liquid crystal panel 42.

The display panel 90 has the same structure as the display panel 90 described in the first embodiment. The display panel 90 displays a picture image captured by the camera 7.

Structure of TN Liquid Crystal Panel

Figure 16:
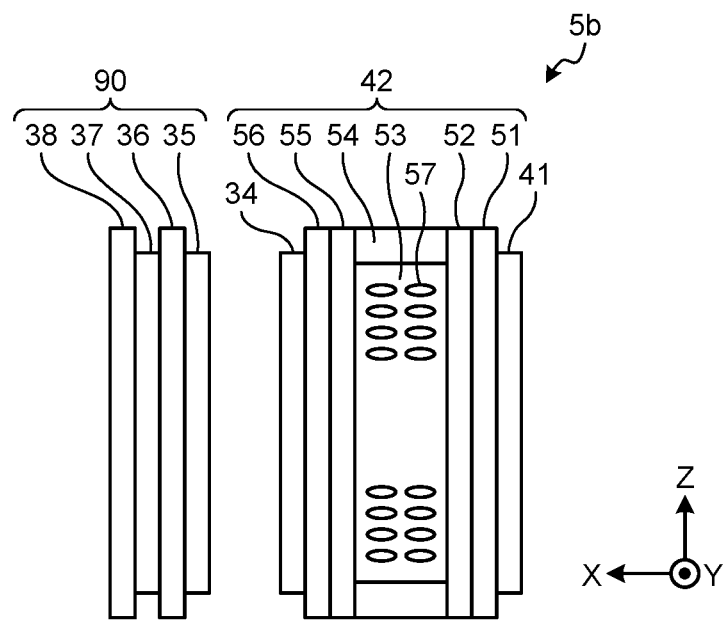
FIG. 16 is a cross-sectional view illustrating a detailed structure of a TN liquid crystal panel included in the electronic mirror device according to the second embodiment together with the vicinity thereof.

A structure and an operation of the TN liquid crystal panel 42 will be described with reference to FIG. 16. FIG. 16 is a cross-sectional view illustrating a detailed structure of the TN liquid crystal panel included in the electronic mirror device according to the second embodiment together with the vicinity thereof.

FIG. 16 is a view illustrating the TN liquid crystal panel 42 and the display panel 90 extracted from the electronic mirror device 5b to illustrate a detailed structure of the TN liquid crystal panel 42 according to the present embodiment. As illustrated in FIG. 16, the TN liquid crystal panel 42 is disposed on a front surface side of the display panel 90, that is, on the negative side of the X axis.

The TN liquid crystal panel 42 is disposed between the linearly polarized light absorbing layer 41 and the linearly reflective polarizing layer 34, when viewed from the negative side of the X axis. A first support plate 51, a first electrode 52, control substances 57, a second electrode 55, and a second support plate 56 are disposed in this order in the TN liquid crystal panel 42, when viewed from the negative side of the X axis.

The first support plate 51 is formed of, for example, a transparent material such as a glass plate to support the first electrode 52 formed on a surface thereof.

The first electrode 52 is a transparent conductive film formed, for example, by depositing an indium tin oxide (ITO) or the like on the surface of the first support plate 51. The first electrode 52 is connected to a power supply although not illustrated in FIG. 16.

The control substances 57 are located between the first electrode 52 and the second electrode 55. More specifically, the control substances 57 are located in a space 53 formed by connecting the first electrode 52 and the second electrode 55 to each other using a sealing material 54 to seal the space 53. The reflectance of the TN liquid crystal panel 42 changes by changing a state in which the control substances 57 are arrayed according to a potential difference between the first electrode 52 and the second electrode 55. The control substances 57 are, for example, liquid crystal molecules. The control substances 57 may be, for example, an electrochromic material (EC material).

The second electrode 55 is a transparent conductive film formed, for example, by depositing an indium tin oxide (ITO) or the like on a surface of the second support plate 56. The second electrode 55 is connected to a power supply although not illustrated in FIG. 16.

The second support plate 56 is formed of, for example, a transparent material such as a glass plate to support the second electrode 55 formed on the surface thereof.

When the first deflection direction and the second deflection direction are not orthogonal to each other in the linearly polarized light absorbing layer 41, the first deflection direction and the second deflection direction may not be orthogonal to each other in the linearly reflective polarizing layer 34.

Operation of TN Liquid Crystal Panel

Figure 17:
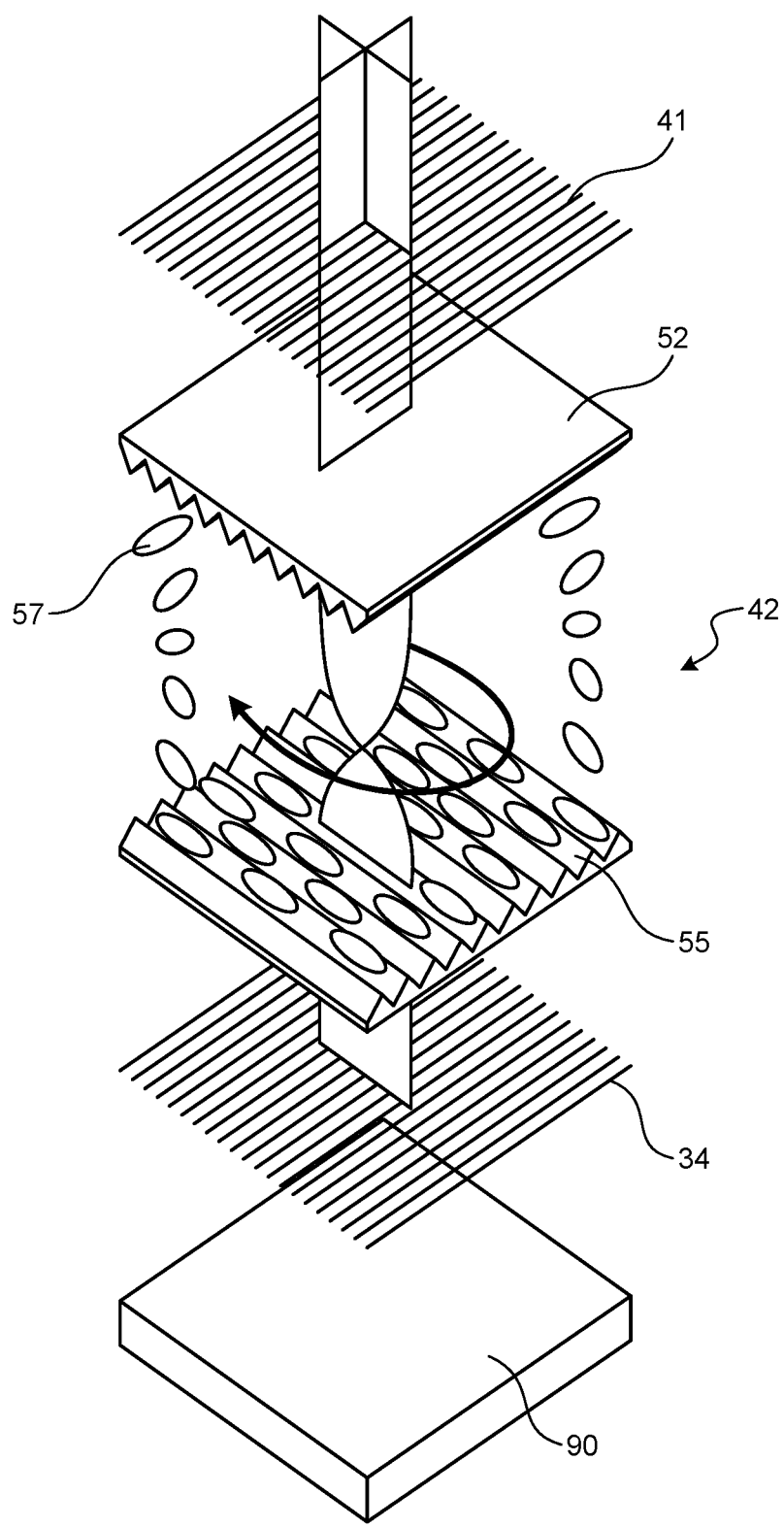
FIG. 17 is a view illustrating an example of a movement of a light beam incident on the TN liquid crystal panel when a voltage is not applied between electrodes.
Figure 18:
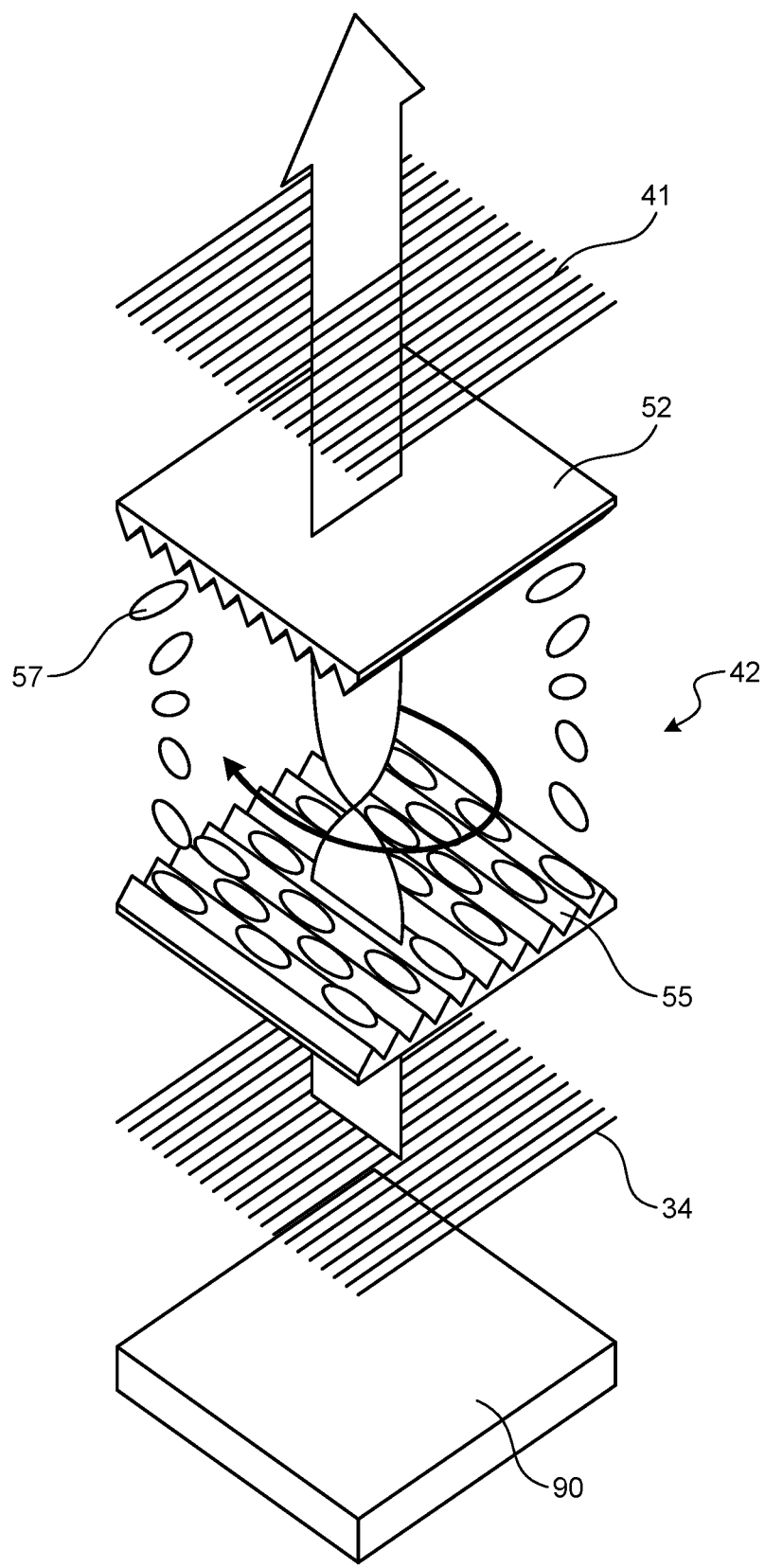
FIG. 18 is a view illustrating an example of a movement of reflected light of a light beam incident on the TN liquid crystal panel when a voltage is not applied between the electrodes.
Figure 19:
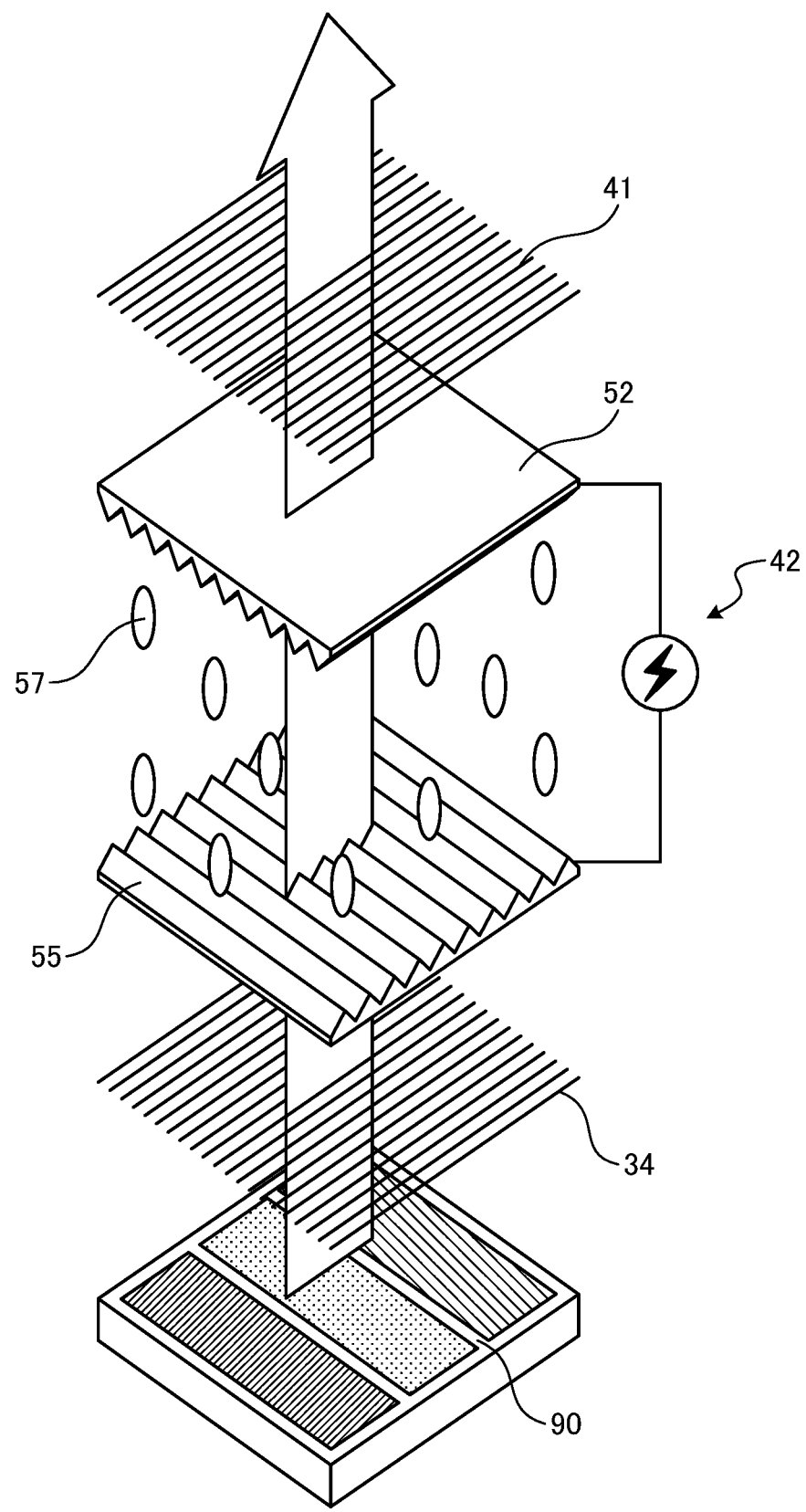
FIG. 19 is a view illustrating an example of a movement of a light beam incident on the TN liquid crystal panel from a display panel when a voltage is applied between the electrodes.

The operation of the TN liquid crystal panel 42 will be described with reference to FIGS. 17, 18, and 19. FIG. 17 is a view illustrating an example of a movement of a light beam incident on the TN liquid crystal panel when a voltage is not applied between the electrodes. FIG. 18 is a view illustrating an example of a movement of reflected light of a light beam incident on the TN liquid crystal panel when a voltage is not applied between the electrodes. FIG. 19 is a view illustrating an example of a movement of a light beam incident on the TN liquid crystal panel from the display panel when a voltage is applied between the electrodes. Note that, in FIGS. 17, 18, and 19, illustration of the first support plate 51, the second support plate 56, and the sealing material 54 is omitted.

FIG. 17 illustrates an example of a movement of light incident on the TN liquid crystal panel 42. It is assumed that the display panel 90 is turned off. Light from above the paper surface including first deflection light deflected in a first deflection direction and second deflection light deflected in a second deflection direction different from the first deflection direction is incident on the TN liquid crystal panel 42. Here, in order to simplify the description, the incident light includes only first deflection light and second deflection light. The second deflection light is absorbed by the linearly polarized light absorbing layer 41, and only the first deflection light is transmitted through the linearly polarized light absorbing layer 41 and is incident on the first electrode 52. At this time, since no voltage is applied between the first electrode 52 and the second electrode 55, the control substances 57, that is, the liquid crystal molecules, are shifted by 90 degrees while being rotated little by little in one direction between the first electrode 52 and the second electrode 55. Since the first deflection light incident on the first electrode 52 travels along a gap between the control substances 57, the deflection direction of the first deflection light is twisted by 90 degrees while the first deflection light travels from the first electrode 52 toward the second electrode 55. Therefore, the second deflection light of which the deflection direction has been rotated by 90 degrees from the first deflection direction is emitted from the second electrode 55.

FIG. 18 illustrates an example of a movement of a light beam incident on the TN liquid crystal panel 42 and reflected by the linearly reflective polarizing layer 34. That is, the second deflection light is reflected by the linearly reflective polarizing layer 34 and is incident on the second electrode 55. While the second deflection light travels from the second electrode 55 toward the first electrode 52, the deflection direction of the second deflection light is twisted by 90 degrees back. Therefore, the first deflection light is emitted from the first electrode 52. The first deflection light is transmitted through the linearly polarized light absorbing layer 41 and emitted to the outside of the TN liquid crystal panel 42. When viewed from an observer, light including first deflection light and second deflection light is incident on the TN liquid crystal panel 42, and only the first deflection light is reflected by the TN liquid crystal panel 42. That is, in the examples of FIGS. 17 and 18, all of the incident first deflection light is converted into the second deflection light by the linearly polarized light absorbing layer 41, all of the second deflection light is reflected by the linearly reflective polarizing layer 34, the reflected second deflection light is converted back into the first deflection light by the TN liquid crystal panel 42, and the first deflection light is emitted from the TN liquid crystal panel 42. At this time, the driver of the vehicle 1 can visually recognize a mirror image reflected on the display surface 13 by the TN liquid crystal panel 42.

FIG. 19 illustrates how light emitted from the display panel 90 is transmitted through the TN liquid crystal panel 42 when a voltage is applied between the first electrode 52 and the second electrode 55. Here, when a first voltage is applied between the first electrode 52 and the second electrode 55, the control substances 57 are arrayed in the vertical direction from the first electrode 52 toward the second electrode 55. In addition, in order to simplify the description, it is assumed that the display panel 90 emits light including only first deflection light.

The first deflection light emitted from the display panel 90 is transmitted through the linearly reflective polarizing layer 34 and the second electrode 55. Since the control substances 57 are arrayed in the vertical direction, the first deflection light travels straight along a gap between the control substances 57 and is emitted from the first electrode 52. Thereafter, the first deflection light is transmitted through the linearly polarized light absorbing layer 41 and emitted to the outside of the TN liquid crystal panel 42. Then, the driver of the vehicle 1 can visually recognize a picture image information displayed on the display panel 90.

Note that the electronic mirror device 5b may have a structure in which the glass 32 is removed from the structure of FIG. 15. In this case, the electronic mirror device 5b includes in the following order: a liquid crystal panel 36; a linearly reflective polarizing layer 34 that transmits a polarization component of incident light in a first direction and reflects a polarization component of the incident light in a second direction different from the first direction; a TN liquid crystal panel 42 configured to be able to change a reflectance with respect to the incident light; a linearly polarized light absorbing layer 41 having a transmission axis disposed to be orthogonal to a polarization reflection axis of the linearly reflective polarizing layer 34; and a PET film 30 bonded to the linearly polarized light absorbing layer 41. The TN liquid crystal panel 42 has a first surface 42a located on a side facing the PET film 30 and a second surface 42b located on a side facing the linearly reflective polarizing layer 34, and the linearly reflective polarizing layer 34 is bonded to the second surface 42b.

Functional Configuration of Electronic Mirror Device

Figure 20:
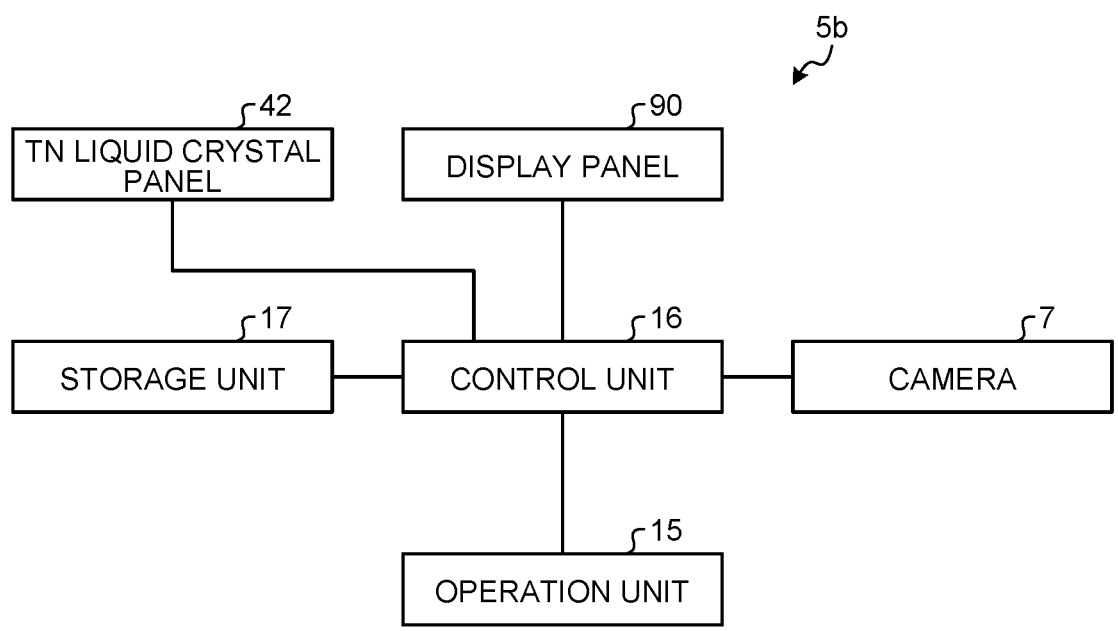
FIG. 20 is a functional block diagram illustrating an example of a functional configuration of the electronic mirror device according to the second embodiment.

A functional configuration of the electronic mirror device 5b will be described with reference to FIG. 20. FIG. 20 is a functional block diagram illustrating an example of a functional configuration of the electronic mirror device according to the second embodiment.

As illustrated in FIG. 20, the electronic mirror device 5b includes a camera 7, a display panel 90, a TN liquid crystal panel 42, a storage unit 17, a control unit 16, and an operation unit 15.

The control unit 16 converts an analog image signal captured by the camera 7 into a digital image signal by A/D conversion, and outputs the digital image signal to the display panel 90.

The control unit 16 acquires an operation signal from the operation unit 15, and selects whether to display a mirror image on the display surface 13 (see FIG. 13) of the electronic mirror device 5b or perform a picture image display output to the display panel 90. When it is selected to display a mirror image, the control unit 16 sets a voltage applied to the TN liquid crystal panel 42 to 0, such that the TN liquid crystal panel 42 is in the state of FIGS. 17 and 18. On the other hand, when it is selected to perform a picture image display, the control unit 16 applies a predetermined voltage to the TN liquid crystal panel 42, such that the TN liquid crystal panel 42 is in the state of FIG. 19.

The storage unit 17 stores a control program executed by the control unit 16, various control parameters used when the control unit 16 performs various kinds of controls, and the like.

Evaluation of Display Quality of Mirror Image Displayed by Electronic Mirror Device According to Second Embodiment A result of evaluating a display quality of a mirror image displayed by the electronic mirror device 5b according to the second embodiment will be described with reference to FIG. 21. FIG. 21 is a view illustrating an example of a result of evaluating a display quality of a mirror image displayed by the electronic mirror device according to the second embodiment.

The inventors evaluated whether a mirror image had uneven brightness when displayed on the display surface 13 of the electronic mirror device 5b, for three types of sequentially biaxially stretched PET films according to the present embodiment, that is, a PET film G (having a retardation value Re of 2050 nm), a PET film H (having a retardation value Re of 2860 nm), and a PET film I (having a retardation value Re of 3990 nm). Similarly, for three types of sequentially biaxially stretched PET films as comparative examples, that is, a PET film J (having a retardation value Re of 960 nm), a PET film K (having a retardation value Re of 1310 nm), and a PET film L (having a retardation value Re of 1740 nm), and for a case where no PET film was used, the inventors evaluated whether a mirror image had uneven brightness when displayed on the display surface 13 of the electronic mirror device 5b.

As a result, when each of the three kinds of PET films according to the present embodiment, i.e. the PET films G, H, and I, was used in the electronic mirror device 5b, no unevenness in brightness was observed, thereby confirming a high display quality. On the other hand, when each of the PET films J, K, and L was used in the electronic mirror device 5b or when no PET film was used in the electronic mirror device 5b as a comparative example, unevenness in brightness was observed, thereby confirming that the display quality was high when the PET film according to the present embodiment was used.

As described above, it was confirmed that the PET film having a retardation value Re in a range of 2000 nm or more and 4000 nm or less according to the present embodiment makes it possible to display a mirror image with high display quality. Note that, even when a film having a retardation value Re of more than 4000 nm is used, it is possible to display a mirror image with high display quality, but the retardation film having a retardation value Re of more than 4000 nm, which is generally called an ultra-high retardation film or the like, needs to be manufactured by a manufacturing method different from the above-described sequential biaxial stretching, resulting in an increase in cost. Therefore, in order to provide a low-cost display device, it is preferable to use a PET film having a retardation value Re in a range of 2000 nm or more and 4000 nm or less.

Effect of Second Embodiment

As described above, an electronic mirror device 5b according to the second embodiment includes: a TN liquid crystal panel 42 disposed between the PET film 30 and the linearly reflective polarizing layer 34 and configured to be able to change a reflectance with respect to incident light; and a linearly polarized light absorbing layer 41 disposed between the TN liquid crystal panel 42 and the PET film 30 and having a transmission axis disposed to be orthogonal to a polarization reflection axis of the linearly reflective polarizing layer 34, wherein the TN liquid crystal panel 42 has a first surface 42a located on a side facing the PET film 30 and a second surface 42b located on a side facing the linearly reflective polarizing layer 34, and the linearly reflective polarizing layer 34 is bonded to the second surface 42b. Therefore, it is possible to improve a display quality of an image reflected from the linearly reflective polarizing layer 34, that is, a mirror image.

In the electronic mirror device 5b according to the second embodiment, the glass 32 has a first surface 32a and a second surface 32b located closer to the liquid crystal panel 36 than the first surface 32a, and the PET film 30 is bonded to the second surface 32b. Therefore, it is possible to improve a display quality of an image reflected from the linearly reflective polarizing layer 34, that is, a mirror image.

In the electronic mirror device 5b according to the second embodiment, the TN liquid crystal panel 42 includes a first electrode 52, a first support plate 51 supporting the first electrode 52, a second electrode 55, a second support plate 56 supporting the second electrode 55, and control substances 57 sandwiched between the first electrode 52 and the second electrode 55, and the linearly reflective polarizing layer 34 is bonded to the second support plate 56. Therefore, switching between a mirror image display and a picture image display in the electronic mirror device 5b can be realized in a structure similar to that of a general display device using a TN liquid crystal panel.

In addition, an electronic mirror device 5b according to the second embodiment includes in the following order: a liquid crystal panel 36 that displays an image; a linearly reflective polarizing layer 34 that transmits a polarization component of incident light in a first direction and reflects a polarization component of the incident light in a second direction different from the first direction; a TN liquid crystal panel 42 configured to be able to change a reflectance with respect to the incident light; a linearly polarized light absorbing layer 41 having a transmission axis disposed to be orthogonal to a polarization reflection axis of the linearly reflective polarizing layer 34; and a PET film 30 bonded to the linearly polarized light absorbing layer 41, wherein the TN liquid crystal panel 42 has a first surface 42a located on a side facing the PET film 30 and a second surface 42b located on a side facing the linearly reflective polarizing layer 34, the linearly reflective polarizing layer 34 is bonded to the second surface 42b, the PET film 30 contains polyethylene terephthalate and has a retardation value Re in a range of 2000 nm or more and 4000 nm or less, and an angle between a slow axis of the PET film 30 and the polarization reflection axis of the linearly reflective polarizing layer 34 is 30 degrees or more and 60 degrees or less. Therefore, it is possible to improve a display quality of an image reflected from the linearly reflective polarizing layer 34, that is, a mirror image.

In the electronic mirror device 5b according to the second embodiment, the PET film 30 is located on an outermost surface of the electronic mirror device 5b. Therefore, it is possible to further reduce a thickness of the electronic mirror device 5b, thereby enhancing its mountability on the vehicle 1.

The display device according to the present disclosure is capable of achieving a high display quality.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display device comprising:
   a display panel that displays an image;
   a reflective polarizing layer that transmits a polarization component of incident light in a first direction and reflects a polarization component of the incident light in a second direction different from the first direction;
   a transparent plate that transmits the incident light; and
   a retardation film bonded to the transparent plate, wherein
   the reflective polarizing layer is disposed between the display panel and the retardation film,
   the retardation film contains polyethylene terephthalate and has a retardation value in a range of 2000 nm or more and 4000 nm or less,
   an angle between a slow axis of the retardation film and a polarization reflection axis of the reflective polarizing layer is 30 degrees or more and 60 degrees or less,
   a slow axis at a first point in the retardation film is more inclined toward a third direction than a slow axis at a second point in the retardation film, and
   the first point is closer to an end of the retardation film in a fourth direction, perpendicular to the third direction, than the second point.

2. The display device according to claim 1, wherein
   the transparent plate has a first surface and a second surface located closer to the display panel than the first surface, and
   the reflective polarizing layer is bonded to the second surface of the transparent plate, and the retardation film is bonded to the first surface of the transparent plate.

3. The display device according to claim 2, wherein
   the retardation film is cut out from a sheet-shaped retardation film manufactured by biaxial stretching, and
   an angle between the slow axis of the cut-out retardation film and the polarization reflection axis of the reflective polarizing layer is 30 degrees or more and 60 degrees or less.

4. The display device according to claim 2, wherein
   the retardation film is bonded to the transparent plate via an adhesive layer having a transmittance of 80% or more and an ultraviolet light absorptivity of 80% or more.

5. The display device according to claim 1, further comprising:
   a reflectance control panel disposed between the retardation film and the reflective polarizing layer, and configured to be able to change a reflectance with respect to the incident light; and
   a polarizer disposed between the reflectance control panel and the retardation film, and having a transmission axis disposed to be orthogonal to the polarization reflection axis of the reflective polarizing layer, wherein
   the reflectance control panel has a first surface located on a side facing the retardation film and a second surface located on a side facing the reflective polarizing layer, and
   the reflective polarizing layer is bonded to the second surface of the reflectance control panel.

6. The display device according to claim 5, wherein
   the transparent plate has a first surface and a second surface located closer to the display panel than the first surface, and
   the retardation film is bonded to the second surface of the transparent plate.

7. The display device according to claim 6, wherein
the reflectance control panel includes a first electrode, a first support plate supporting the first electrode, a second electrode, a second support plate supporting the second electrode, and control substances sandwiched between the first electrode and the second electrode, and
the reflective polarizing layer is bonded to the second support plate.

8. The display device according to claim 6, wherein
the retardation film is cut out from a sheet-shaped retardation film manufactured by biaxial stretching, and
an angle between the slow axis of the cut-out retardation film and the polarization reflection axis of the reflective polarizing layer is 30 degrees or more and 60 degrees or less.

9. The display device according to claim 6, wherein
the retardation film is bonded to the transparent plate via an adhesive layer having a transmittance of 80% or more and an ultraviolet light absorptivity of 80% or more.

10. The display device according to claim 5, wherein
the reflectance control panel includes a first electrode, a first support plate supporting the first electrode, a second electrode, a second support plate supporting the second electrode, and control substances sandwiched between the first electrode and the second electrode, and
the reflective polarizing layer is bonded to the second support plate.

11. The display device according to claim 5, wherein
the retardation film is cut out from a sheet-shaped retardation film manufactured by biaxial stretching, and
an angle between the slow axis of the cut-out retardation film and the polarization reflection axis of the reflective polarizing layer is 30 degrees or more and 60 degrees or less.

12. The display device according to claim 5, wherein
the retardation film is bonded to the transparent plate via an adhesive layer having a transmittance of 80% or more and an ultraviolet light absorptivity of 80% or more.

13. The display device according to claim 1, wherein
the retardation film is cut out from a sheet-shaped retardation film manufactured by biaxial stretching, and
an angle between the slow axis of the cut-out retardation film and the polarization reflection axis of the reflective polarizing layer is 30 degrees or more and 60 degrees or less.

14. The display device according to claim 1, wherein
the retardation film is located on an outermost surface of the display device.

* * * * *